United States Patent
Khan et al.

Patent Number: 5,606,646
Date of Patent: Feb. 25, 1997

[54] RECURRENT NEURAL NETWORK-BASED FUZZY LOGIC SYSTEM

[75] Inventors: Emdadur R. Khan, San Jose; Faith A. Unal, Sunnyvale, both of Calif.

[73] Assignee: National Semiconductor Corporation, Santa Clara, Calif.

[21] Appl. No.: 265,194

[22] Filed: Jun. 24, 1994

Related U.S. Application Data

[63] Continuation-in-part of Ser. No. 36,634, Mar. 24, 1993.
[51] Int. Cl.⁶ .................. G06E 1/00; G06E 3/00
[52] U.S. Cl. .................. 395/24; 395/3; 395/21; 382/158
[58] Field of Search .................. 395/24, 3, 21, 395/22, 23; 382/158

[56] References Cited

U.S. PATENT DOCUMENTS

| | | | |
|---|---|---|---|
| 5,087,826 | 2/1992 | Holler et al. | 307/201 |
| 5,129,039 | 7/1992 | Hiraiwa | 395/24 |
| 5,168,549 | 12/1992 | Takagi et al. | 395/3 |
| 5,408,424 | 4/1995 | Lo | 364/724.01 |
| 5,479,571 | 12/1995 | Parlos et al. | 395/21 |
| 5,485,545 | 1/1996 | Kojima et al. | 395/22 |
| 5,524,176 | 6/1996 | Narita et al. | 395/22 |

FOREIGN PATENT DOCUMENTS

| | | | |
|---|---|---|---|
| 2-260002 | 10/1990 | Japan | G05B 13/02 |
| 2-292602 | 12/1990 | Japan | G05B 13/02 |
| 3-268077 | 11/1991 | Japan | G06F 7/60 |
| 3-291729 | 12/1991 | Japan | G06F 9/44 |
| 4-92901 | 3/1992 | Japan | G05B 13/02 |
| 4-77828 | 3/1992 | Japan | G06F 9/44 |
| 4077828 | 3/1992 | Japan | G06F 9/44 |
| 4-170641 | 6/1992 | Japan | G06F 9/44 |
| 4-186402 | 7/1992 | Japan | G05B 13/02 |
| 4-205163 | 7/1992 | Japan | G06F 15/18 |

OTHER PUBLICATIONS

Keller, et al., "Fuzzy Logic Inference Neural Networks", SPIE, vol. 1192, pp. 582–591, Intelligent Robots and Computer Vision VIII: Algorithms and Techniques, 1989.

Cox, Earl, "Integrating Fuzzy Logic into Neural Nets", AI Expert, Jun. 1992, pp. 43–47.

Cela, et al., "Towards A Neural Fuzzy Controller", IEEE, Systems, Man, and Cybernetics, 1992 International, pp. 1277–1282.

Horikawa, et al., "On Fuzzy Modeling Using Fuzzy Neural Networks with the Back–Propagation Algorithm", IEEE, Transactions on Neural Networks, vol. 3, No. 5 Sep. 1992, pp. 801–806.

Sun, et al., "Fuzzy Modeling Based On Generalized Neural Networks And Fuzzy Clustering Objective Functions", IEEE, Proceedings of the 30th Conference on Decisions and Control, Dec. 1991, Brighton, England, pp. 2924–2929.

Kawamura, et al., "A Prototype of Neuro–Fuzzy Cooperation System", IEEE International Conference On Fuzzy Systems, Mar. 8–12, 1992, San Diego, CA pp. 1275–1282.

Cella, et al, "Towards a Neural Fuzzy Cont.", IEEE Int. Conf. on SMC, 1992, pp. 1277–1282.

(List continued on next page.)

*Primary Examiner*—Robert W. Downs
*Assistant Examiner*—A. Katbab
*Attorney, Agent, or Firm*—Limbach & Limbach L.L.P.

[57] ABSTRACT

A recurrent, neural network-based fuzzy logic system includes neurons in a rule base layer which each have a recurrent architecture with an output-to-input feedback path including a time delay element and a neural weight. Further included is a neural network-based, fuzzy logic finite state machine wherein the neural network-based, fuzzy logic system has a recurrent architecture with an output-to-input feedback path including at least a time delay element. Still further included is a recurrent, neural network-based fuzzy logic rule generator wherein a neural network receives and fuzzifies input data and provides data corresponding to fuzzy logic membership functions and recurrent fuzzy logic rules.

57 Claims, 12 Drawing Sheets

OTHER PUBLICATIONS

Nishiguchi, E. et al, Jap. Patent Application No. 2-292602 (Dec. 1990). Translated.

Hamid R. Berenji, "Refinement of Approximate Reasoning-Based Controllers By Reinforcement Learning", Machine Learning: Proceedings of the Eighth International Workshop, Evanston, Illinois, Jun. 27–29, 1991 (5 pages).

Junhong Nie and D. A. Linkens,"Fuzzy Reasoning Implemented by Neural Networks", IEEE 1992, pp. II–702–II–707.

James J. Buckley, Yoichi Hayashi and Ernest Czogala, "On the Equivalence of Neural Networks and Fuzzy Expert Systems" IEEE 1992, pp. II–691– II–695.

D. E. Rumelhart, G. E. Hinton and R. J. Williams, "Learning Internal Representations By Error Propagation", 1986, Chapter 41, pp. 675–682.

E. Khan et al., "NeuFuz: Neural Network Based Fuzzy Logic Design Algorithms", FUZZ–IEEE'93 Proceedings, vol. 1, pp. 647–654 (Mar. 28 – Apr. 1, 1993).

E. H. Mamdani, "Twenty Years of Fuzzy Control: Experienes Gained and Lessons Learnt", FUZZ–IEEE'93 Proceedings, vol. 1, pp. 339–344 (Mar. 28– Apr. 1, 1993).

Z. Kohavi, "Switching and Finite Automata Theory", McGraw–Hill, New York, 1978, pp. 322 and 323.

"National Semiconductor Looks To Marry Neural and Fuzzy Control", Electronics Products, Aug. 1992, p. 21.

"System Writes Fuzzy Logic Automatically", Electronics, 27 Jul. 1992, p. 4.

RECURRENT NEURAL NETWORK-BASED FUZZY LOGIC SYSTEM

RELATED APPLICATIONS

This is a Continuation-In-Part of U.S. patent application Ser. No. 08/036,634, filed Mar. 24, 1993, and entitled "Fuzzy Logic Design Generator Using A Neural Network To Generate Fuzzy Logic Rules And Membership Functions For Use In Intelligent Systems" (the disclosure of which is incorporated herein by reference).

BACKGROUND OF THE INVENTION

1. Field of the Invention

The present invention relates to intelligent controllers, and in particular, intelligent controllers using neural network-based fuzzy logic.

2. Description of the Related Art

Uses of intelligent controllers have become more numerous and varied in keeping pace with the numerous and varied control requirements of complex modern electronic systems. For example, intelligent controllers are being called upon more frequently for use in assisting or use as servomechanism controllers, as discussed in commonly assigned U.S. patent applications Ser. No. 07/967,992, now U.S. Pat. No. 5,471,381, entitled "Intelligent Servomechanism Controller Using a Neural Network", and Ser. No. 07/859,328, now U.S. Pat. No. 5,448,681, entitled "Intelligent Controller With Neural Network and Reinforcement Learning" (the disclosures of which are each incorporated herein by reference). Further applications include control systems for robotic mechanisms.

One type of intelligent controller seeing increased use and wider application uses "approximate reasoning", and in particular, fuzzy logic. Fuzzy logic, initially developed in the 1960s (see L.A. Zadeh et al., "Fuzzy Sets and Applications", Selected Papers of L.A. Zadeh, by R.R. Yager, S. Ouchinnikov et al. (Eds.), John Wiley & Sons, 1987), has proven to be very successful in solving problems in many control applications where conventional model-based (mathematical modeling of the system to be controlled) approaches are very difficult, inefficient or costly to implement.

An intelligent controller based upon fuzzy logic design has several advantages including simplicity and ease of design. However, fuzzy logic design does have a number of disadvantages as well. As the control system complexity increases, it quickly becomes more difficult to determine the right set of rules and membership functions to accurately describe system behavior. Further, particularly in a feed-forward system, no recurrent information is embedded. In other words, conventional fuzzy logic rules retain no information about prior results or decisions. Hence, the ability to describe system behavior is limited.

The application of neural networks to learn system behavior has been suggested to overcome some of the problems associated with fuzzy logic-based designs. Using a system's input and output data, a neural network can learn the system behavior and, accordingly, generate fuzzy logic rules. See e.g.: E. Khan et al., "NeuFuz: Neural Network Based Fuzzy Logic Design Algorithms", FUZZ-IEEE'93 Proceedings, Vol. 1, pp. 647–54 (Mar. 28–Apr. 1, 1993); E. Khan, "Neural Network Based Algorithms For Rule Evaluation and Defuzzification In Fuzzy Logic Design", WCNN'93 Proceedings, Vol. 2, pp. 31–38 (Jul. 11–15, 1993); E. Khan, "NeuFuz: An Intelligent Combination of Fuzzy Logic With Neural Nets", IJCNN'93 Proceedings, Vol. 3, pp. 2945–50 (Oct. 25–29, 1993); B. Kosko, "Neural Nets and Fuzzy Systems", Prentice Hall 1992; J. Nie et al., "Fuzzy Reasoning Implemented By Neural Networks", Proceedings of IJCNN92 (International Joint Conference on Neural Networks, June 1992), pp. II702–07; and J. Buckley et al., "On the Equivalent of Neural Networks and Fuzzy Logic", Proceedings of IJCNN92, pp. II691–95.

However, a neural network may not always be the most effective way to implement an intelligent controller, since implementation of a neural network is more costly compared to fuzzy logic implementations. For example, fuzzy logic may be more effective for a particular application and, by proper programming, a conventional embedded controller can be used to implement the fuzzy logic. A neural network implementation by programming of the conventional embedded controller is also possible, but it will typically be significantly slower. Furthermore, a dedicated hardware implementation, generally more desirable, is more common for fuzzy logic than for a neural network, particularly when considering the relative costs of each.

Another problem with a neural network-based solution, particularly in a feed-forward system, is its dependence upon the present state of the input information or data. Difficulties arise when a solution requires memory in such applications as pattern recognition (including speech and handwriting), seismic signal processing, language processing, and spatiotemporal signal processing. For such applications, the outputs are not only the functions of the present inputs but also of the previous inputs and/or outputs as well.

Accordingly, it would be desirable to have an improved technique for applying neural network design to the design and implementation of fuzzy logic. In particular, it would be desireable to have a neural network-based, fuzzy logic design in which prior information could be retained for context-sensitive processing such as that needed for spatiotemporal signals. Further, it would be desirable to have an improved fuzzy logic design in which antecedent processing, rule evaluation (fuzzy inferencing) and defuzzification can be performed upon control signals generated in accordance with such neural network-based fuzzy logic design.

SUMMARY OF THE INVENTION

A recurrent neural network-based fuzzy logic system in accordance with one embodiment of the present invention includes one or more neurons with feedback paths. Each neuron is for coupling to an antecedent signal source to receive therefrom at least two antecedent signals and in accordance therewith provide a consequent signal. Each of the antecedent signals corresponds to a fuzzy logic rule antecedent, and the consequent signal corresponds to a fuzzy logic rule consequent. The feedback path receives and time-delays the consequent signal to provide one of the two or more antecedent signals for the neuron. The antecedent signal source preferably includes multiple neurons for receiving and fuzzifying an input signal to provide the second one of the two or more antecedent signals.

A recurrent neural network-based fuzzy logic system in accordance with another embodiment of the present invention includes a neural network and a feedback path. The neural network includes multiple signal ports with which it receives multiple input signals, including an external input signal and a present state signal, and provides in accordance therewith a next state signal. The feedback path is coupled to multiple ones of the signal ports and receives and time-delays the next state signal to provide the present state signal for the neural network. One embodiment of the neural network includes two sets of neurons and an output neuron layer. One set of neurons receives and fuzzifies the input signals to provide fuzzified input signals. The other set of neurons is coupled to the first set of neurons and receives and processes the fuzzified input signals in accordance with a set of fuzzy logic rules and membership functions to provide a plurality of output signals which corresponds to a set of fuzzy logic rule consequents. The output neuron layer is coupled to the second set of neurons and receives and defuzzifies the output signals and in accordance therewith provides the next state signal.

A recurrent neural network-based fuzzy logic system in accordance with still another embodiment of the present invention includes a neural network for generating a set of recurrent fuzzy logic rules. One set of neurons receives and fuzzifies a set of input signals to provide a set of fuzzified signals. A second set of neurons is coupled to the first set of neurons and receives the fuzzified signals and in accordance therewith provides membership signals which correspond to fuzzy logic membership functions. A third set of neurons is coupled to the second set of neurons and receives the membership signals and in accordance therewith provides rule signals which correspond to recurrent fuzzy logic rules.

Hence, a recurrent neural network-based fuzzy logic system in accordance with the present invention provides for the retention and use of context-sensitive knowledge within a neural network-based, fuzzy logic system. In a recurrent neural network-based fuzzy logic system in which intra-system recurrency is used, a fuzzy finite state machine can be created wherein knowledge of prior system states is used during recall operation, thereby providing for faster and more accurate system operation (e.g. faster and more accurate classification of input patterns). In a recurrent neural network-based fuzzy logic system in which intra-neuron recurrency is used, knowledge of prior system outputs is used during both training and recall operations, thereby providing for even more accurate system operation due to the finer, more precise system learning which takes place.

These and other features and advantages of the present invention will be understood upon consideration of the following detailed description of the invention and the accompanying drawings.

DETAILED DESCRIPTION OF THE INVENTION

Figure 1A:
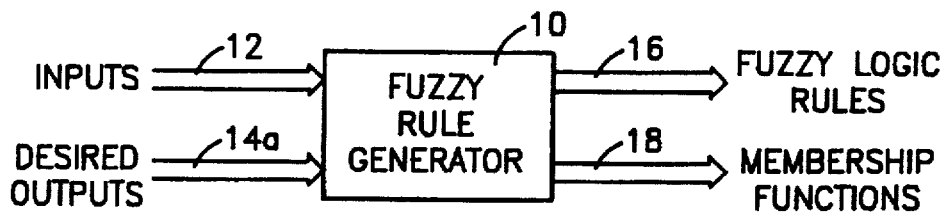
FIG. 1A depicts a fuzzy rule generator in accordance with the present invention.
Figure 1B:
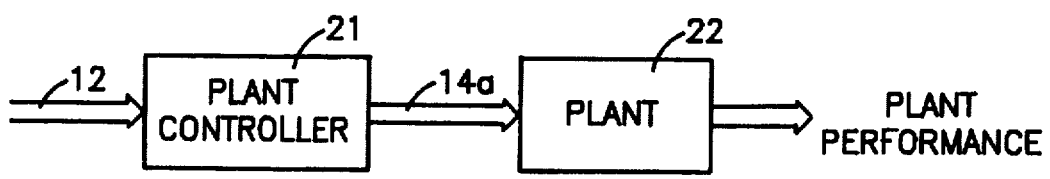
FIG. 1B illustrates a plant controller driving a plant, wherein the inputs and outputs of the plant controller are used for learning purposes by the fuzzy rule generator of FIG. 1A.

Referring to FIGS. 1A and 1B, a fuzzy rule generator 10 for generating fuzzy logic rules and membership functions with a neural network in accordance with the present invention receives input signals 12 and 14a representing the inputs and desired outputs, respectively, of a plant controller 21 used for controlling a plant 22. As is known in the art, the input 12 and desired output 14a data can be generated in a number of ways, such as simulation, measurement and learning of the inverse of the plant model. (See e.g. commonly assigned U.S. patent application Ser. No. 07/967,992, entitled "Intelligent Servomechanism Controller Using a Neural Network", now U.S. Pat. No. 5,421,381, the disclosure of which is incorporated herein by reference). Based upon this input data 12, 14a, the fuzzy rule generator 10, in accordance with neural network learning techniques, o develops fuzzy logic rules and membership functions (discussed further below), and provides output signals 16 and 18 which represent those fuzzy logic rules and membership functions, respectively.

Figure 2A:
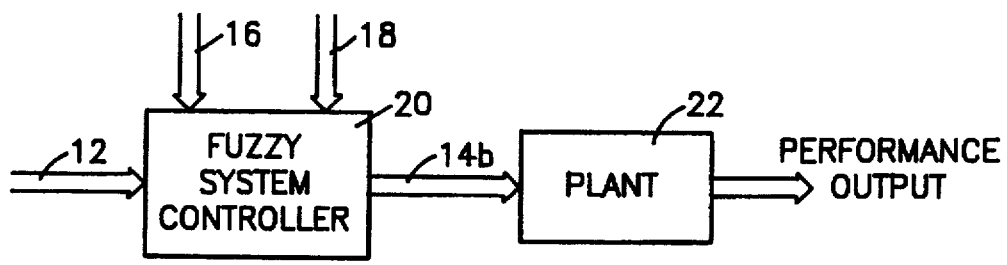
FIG. 2A illustrates a neural network driving a plant, in a feed-forward configuration, using the fuzzy logic rules and membership functions generated by the fuzzy rule generator of FIG. 1A.
Figure 2B:
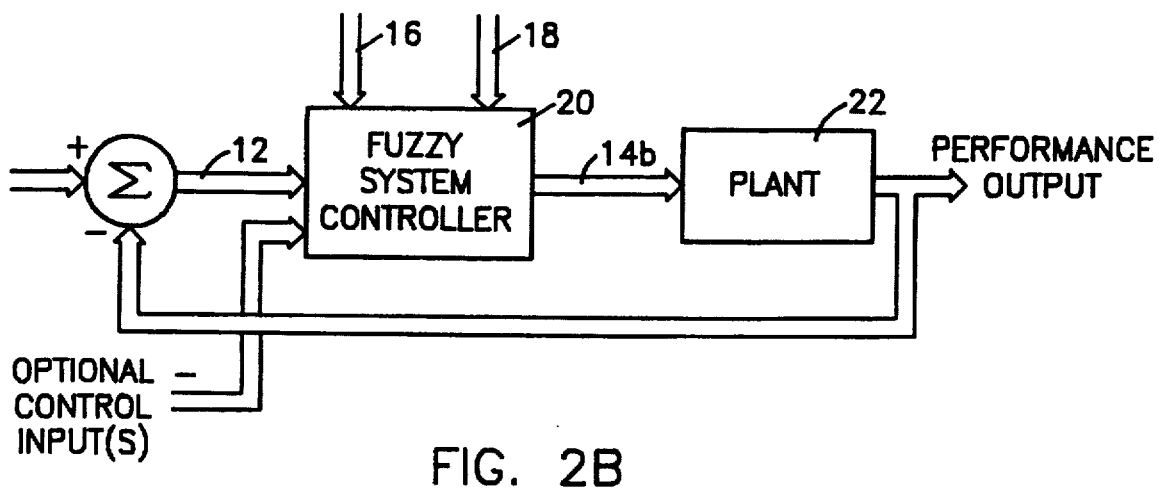
FIG. 2B illustrates a neural network driving a plant, in a feedback configuration, using the fuzzy logic rules and membership functions generated by the fuzzy rule generator of FIG. 1A.

Referring to FIGS. 2A and 2B, these fuzzy logic rules 16 and membership functions 18 are used by a fuzzy system controller 20 for generating plant control input(s) 14b in accordance with its inputs 12. (FIG. 2A illustrates a system with a feed-forward configuration, and FIG. 2B illustrates a system with a feedback configuration [with provision for other, optional inputs, such as an error change input].) Ideally, these controller outputs 14b generated by the fuzzy system controller 20 in accordance with the fuzzy logic rules 16 and membership functions 18 are identical to the desired outputs 14a originally used by the fuzzy role generator 10 for its learning (i.e. for the same controller inputs 12). In practice, these controller outputs 14a and 14b are quite close, and often identical, when using fuzzy logic rules 16 and membership functions 18 generated with a fuzzy role generator 10 in accordance with the present invention.

Figure 3:
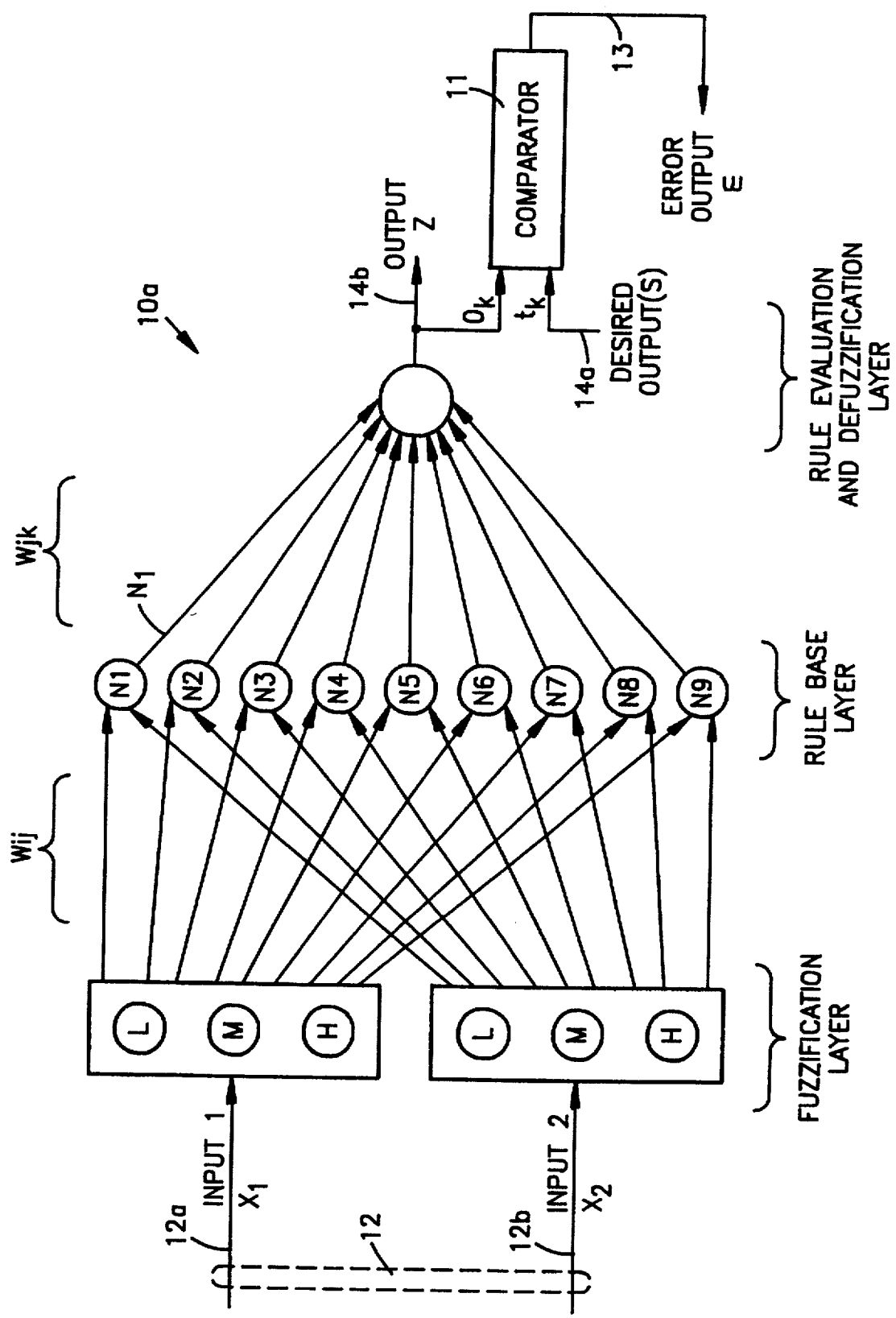
FIG. 3 illustrates a neural network for generating fuzzy logic rules and membership functions in accordance with the present invention.

Referring to FIG. 3, that portion 10a of the fuzzy rule generator 10 which forms the learning mechanism of the neural network includes a comparator 11 and three neural layers: (1) fuzzification; (2) rule base; and (3) role evaluation and defuzzification. For the sake of simplicity in describing a preferred embodiment of the present invention, the learning mechanism 10a illustrated uses a three-layer neural network for generating the fuzzy logic rules and membership functions of a two-input, one-output system. (However, it should be understood that further embodiments of the present invention include such learning mechanisms using neural networks with more than three layers for generating the fuzzy logic rules and membership functions of systems with other than two inputs or one output.)

The first, or input, layer performs the fuzzification. The values of the input signals $X_1$, $X_2$ are matched against the labels used according to the fuzzy control rule. For this example, the fuzzy control rules represent relative input signal amplitudes classified as low "L"), medium "M") or high "H"). The fuzzification layer is used to define the input membership functions. The middle, or rule base, layer (neurons N1 through N9) represents the fuzzy logic role base. The actual output 14b of the output neuron is compared against the desired output(s) 14a, with the resulting error $\epsilon$ being used in the neural network's learning process.

In accordance with one embodiment of the present invention, the rule base neurons N1 through N9 have linear activation functions which perform multiplication, rather than summation, and have slopes of unity. Further, linear neurons whose functions also have slopes of unity are used for the output (rule evaluation and defuzzification) layer neuron. Therefore, the equivalent error $\epsilon_k$ at the input of the output layer can be computed as follows:

$$\epsilon_k = (t_k - O_k) f_k'  \quad (1)$$

where:

$\epsilon_k$=equivalent error at the input of the output layer neuron $f_k'$=first derivative of the function of the output layer neuron $t_k$=desired output 14a of the output layer neuron $O_k$=actual output 14b of the output layer neuron Once this equivalent error $\epsilon_k$ has been computed, the middle-to-output layer weights $W_{jk}$ can be modified, or updated as follows:

$$W_{jk(new)} = W_{jk(old)} + \eta \epsilon_k O_j \quad (2)$$

where:

$W_{jk(new)}$=updated weight between middle (hidden) layer neuron j and output layer neuron k $W_{jk(old)}$=original weight between middle (hidden) layer neuron j and output layer neuron k $\eta$=learning rate $\epsilon_k$=equivalent error at the input of the output layer neuron $O_j$ actual output of the hidden layer neuron (Further discussion of interlayer weight modification can be found in the aforementioned commonly assigned U.S. patent application Ser. No. 07/859,328, entitled "Intelligent Controller With Neural Network and Reinforcement Learning", the disclosure of which is incorporated herein by reference.)

Next, the equivalent error $\epsilon_j$ at the input to the middle, or hidden, layer neurons N1 through N9 can be computed according to back-propagation modeling techniques as follows:

$$\epsilon_j = f_j' \sum_k \epsilon_k W_{jk} \quad (3)$$

where:

$\epsilon_j$=equivalent error at the input of middle (hidden) layer j $f_j'$=first derivative of the function of middle (hidden) layer neuron j (Further discussion of this back-propagation modeling technique can be found in the aforementioned commonly assigned U.S. patent application Ser. No. 07/967,992, entitled "Intelligent Servomechanism Controller Using a Neural Network", the disclosure of which is incorporated herein by reference.)

Following that, the equivalent error $\epsilon_i$ at the input to the input, or fuzzification, layer can be computed. However, as noted above, the middle, i.e. rule base, layer neurons N1 through N9 use multiplication instead of summation, as follows:

$$f_j = \prod_i W_{ij} o_i \quad (4)$$

where:

$f_j$=function describing the operation of the middle (hidden) layer neuron $W_{ij}$=weight between input layer neuron i and middle (hidden) layer neuron j $O_i$=output of input neuron i Accordingly, the equivalent error $\epsilon_i$ at the input to the fuzzification layer is computed as follows:

$$\epsilon_i = f_i' \sum_j \left[ \epsilon_j W_{ij} \left( \prod_{i, i \neq m} W_{mj} o_m \right) \right] \quad (5)$$

where:

$\epsilon_i$=equivalent error at the input of input layer i $f_i'$=first derivative of the function of input layer neuron i $\epsilon_j$=equivalent error at the input of middle (hidden) layer j $W_{ij}$=weight between input layer neuron i and middle (hidden) layer neuron j $W_{mj}$=weight between input layer neuron m and middle (hidden) layer neuron j $O_m$=output of input neuron m The input-to-middle layer weights $W_{ij}$ can then be modified, or updated, as needed using an equation similar to Equation (2) above, with appropriate substitutions for the corresponding equivalent error $\epsilon_n$ and output $O_n$ signals.

As seen in FIG. 3, the inputs to the middle layer neurons N1 through N9 are the preconditions, or antecedents, of the rules, and the outputs are the conclusions, or consequents. Accordingly, rule base layer neuron N1 can be interpreted as representing the rule that "if input $X_1$ is low and input $X_2$ is low, then the output is $N_1$,", wherein $N_1$ can be used to represent the fuzzy conclusion from rule number one.

As noted above, and as is evident from Equation (4) above, the antecedent processing of the present invention uses a multiplication operation, rather than a "minimum" operation as is used in conventional fuzzy logic design. As discussed further below, this means that the signals representing the antecedents are multiplied within the rule base layer neurons N1 through N9, rather than summed and compared to a threshold, or minimum, reference value. For a two-input, one-output learning mechanism 10a, as shown in FIG. 3, if three membership functions are used, we need a maximum of $3^2$=9 rules. Therefore, we need nine middle, or rule base, layer neurons as shown. The output layer neuron, as discussed further below, performs the rule evaluation and defuzzification.

To help expedite learning and convergence, the neural network 10a of the fuzzy rule generator 10 is first initialized with some suitable values of interlayer weights $W_{ij}$, $W_{jk}$. Following that, a set of input 12 and desired output 14 data is applied for several cycles to allow the neural network 10a to converge. At that point, as discussed further below, the generated fuzzy logic rules and membership functions can be extracted. The inputs 12, 14 should be selected so as to cover the entire potential input range well. This will result in better learning, and therefore, a better set of fuzzy logic rules and membership functions. Also, the learning rates used for modifying the interlayer weights should be selected so that the neural network does not oscillate and so that it converges to a good local minima.

If it is desired to generate membership functions of different shapes, the fuzzification layer of FIG. 3 can be constructed of multiple layers of various types of neurons, including combinations of linear and nonlinear function neurons. Accordingly, the weight modification Equations (1) through (5) above will also be modified to correspond to these additional layers of neurons that generate the membership functions.

Figure 4:
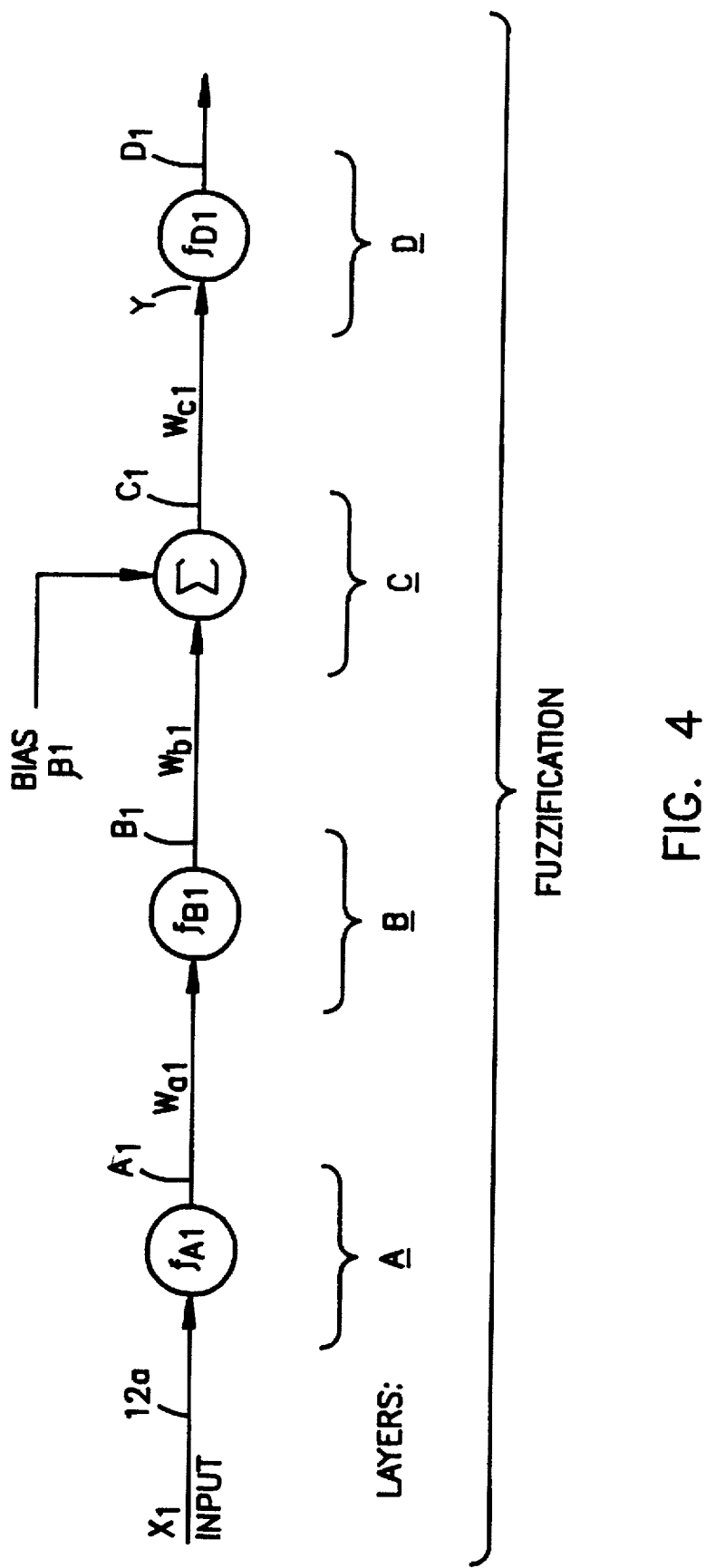
FIG. 4 illustrates an exemplary portion of the fuzzification layer of the neural network illustrated in FIG. 3.

Referring to FIG. 4, the fuzzification layer of the learning mechanism neural network 10a of FIG. 3 can be constructed of four layers A, B, C, D of neurons. For the sake of simplicity, only one signal path for input $X_1$ is shown. It should be understood that, depending upon how many membership functions are used for each input, additional signal paths will be required.

The input signal $X_1$ is processed by layer A and B neurons whose functions are $f_{A1}$ and $f_{B1}$, respectively. Their outputs $A_1$ and $B_1$ are weighted by the interlayer weights $W_{a1}$ and $W_{b1}$, respectively, with the result (i.e. the multiplication product $X_1 f_{A1} W_{a1} f_{b1} W_{b1}$) being summed in layer C with a bias signal $\beta_1$. The sum output $C_1$, weighted by interlayer weight $W_{c1}$, forms the input signal Y for the layer D neuron, whose nonlinear function $f_{D1}$ produces the output signal $D_1$ which goes to neuron N1 of the rule base layer (FIG. 3). Mathematically, this signal path can be represented as follows:

$$y=(X_1 f_{A1} f_{B1} W_{b1}+\beta_1)W_{c1} \qquad (6)$$

where:

$X_1$=first input $f_{A1}$=first layer neuron function $W_{A1}$=weight between the first and second layer neurons $f_{B1}$=second layer neuron function $W_{b1}$=weight between the second and third layer neurons $\beta_1$=bias no. 1

$W_{c1}$=weight between the third and fourth layer neurons

The neural functions $f_{a1}$ and $f_{B1}$ of layers A and B can be kept constant, e.g. as linear gain functions, with the interlayer weights $W_{a1}$, $W_{b1}$ and $W_{c1}$ available for modification during the learning process. If the nonlinear function $f_{D1}$ of layer D is an exponential function (e.g. of the form $1/[1+e^{-y}]$), then the output $D_1$ can be expressed as follows:

$$\begin{aligned}D_1 &= f_D = 1/(1+e^{-y}) \\ &= \frac{1}{1+\exp[-y]} \\ &= \frac{1}{1+\exp[-(X_1 f_{A1} W_{A1} f_{B1} W_{b1}+\beta_1)W_{c1}]}\end{aligned} \qquad (7)$$

During learning, i.e. by modifying weights $W_{a1}$, $W_{b1}$, and $W_{c1}$, an exponential membership function can be established. As will be recognized from Equation (7) above, the size and shape of this membership function is determined by the weights $W_{a1}$, $W_{b1}$ and $W_{c1}$, and the bias $\beta_1$. Accordingly, by using different initial values of weights and biases among the various input signal paths, various exponential membership functions of the same type but with different shapes, sizes and positions, can be generated. For example, by using multiple neurons in layers C and D, and using different weight values for their input weights $W_{b1}$ and $W_{c1}$, any class of exponential type membership functions can be generated. Such membership functions would meet the criteria necessary to back-propagate error signals. However, it should be understood that other suitable mathematical functions could be used as well, such as $(1-e^{-y})/(1+e^{-y})$.

After these membership functions have been generated, the weights $W_{a1}$, $W_{b1}$, $W_{c1}$ remain fixed, and a neural network Recall operation will classify the input $X_1$ in one or more fuzzy logic classes (where each neuron in layer D defines a fuzzy logic class). (To perform the Recall operation, the input pattern $\vec{X}$, or vector, is applied to the input layer and propagated through the network without modifying any interlayer weights.)

The AND operation of the membership function noted above is performed as a multiplication operation. Therefore, the antecedent processing is performed according to:

$$v_c = v_a v_b \qquad (8)$$

where:

$V_c$=membership function of the combination of membership functions $V_a$ and $V_b$ $V_a$=membership function of input A $V_b$=membership function of input B This use of multiplication, which is dictated by the use of a neural network, produces significantly improved results over those obtained using a "minimum" operation for processing the antecedents. Since the antecedent processing, and the rule evaluation and defuzzification are all based on neural network learning, as discussed further below, use of a "minimum" operation instead of a multiplication operation produces significant errors. Examples of the errors encountered can be seen by referring to Table 1 below.

TABLE 1

| INPUT 1 | INPUT 2 | MINIMUM | MULTIPLICATION |
|---------|---------|---------|----------------|
| 1.0 | 1.0 | 1.0 | 1.0 |
| 0.9 | 0.9 | 0.9 | 0.81 |
| 0.8 | 0.8 | 0.8 | 0.64 |
| 0.7 | 0.7 | 0.7 | 0.49 |
| 0.6 | 0.6 | 0.6 | 0.36 |
| 0.5 | 0.5 | 0.5 | 0.25 |
| 0.4 | 0.4 | 0.4 | 0.16 |
| 0.3 | 0.3 | 0.3 | 0.09 |
| 0.2 | 0.2 | 0.2 | 0.04 |
| 0.1 | 0.1 | 0.1 | 0.01 |

Figure 5:
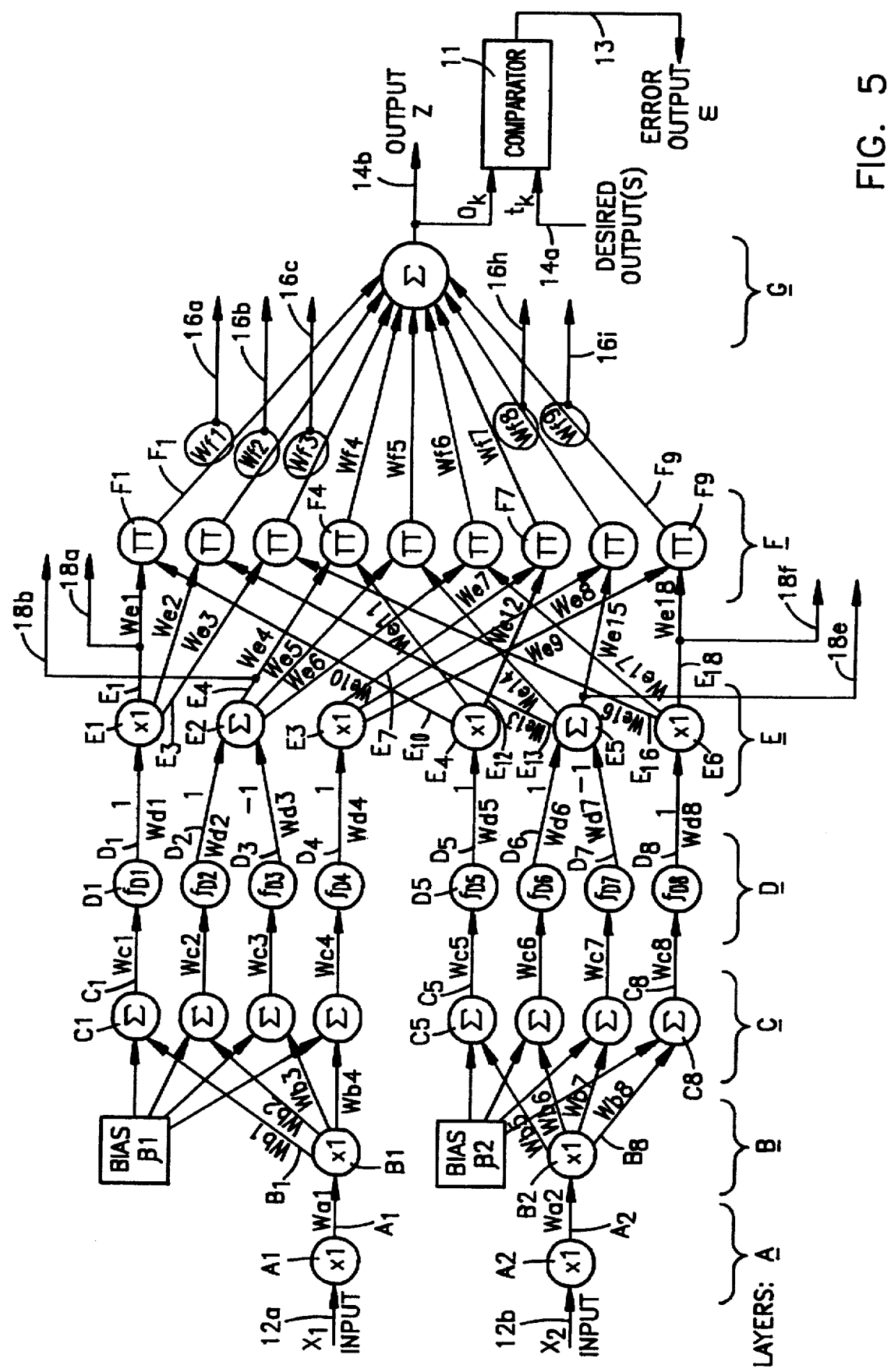
FIG. 5 illustrates in more detail the neural network of FIG. 3.

Referring to FIG. 5, one embodiment of a two-input, one-output neural network 10a in accordance with the present invention includes seven layers of neurons, i.e.

layers A through G. The input signals $X_1$ and $X_2$ are received by the layer A neurons A1 and A2, which have gains of unity and produce intermediate signals $A_1$ and $A_2$, respectively. These signals $A_1$, $A_2$ are multiplied, i.e. weighted, by their respective interlayer weights $W_{a1}$ and $W_{a2}$ and received by the layer B neurons B1 and B2, which have gains of unity and produce intermediate signals $B_1$ through $B_4$ and $B_5$ through $B_8$, respectively (where $B_1=B_2=B_3=B_4$ and $B_5=B_6=B_7=B_8$).

These intermediate signals $B_1$ through $B_8$ are weighted by their respective interlayer weights $W_{b1}$ through $W_{b8}$ and received by the layer C neurons C1 through C8, which also receive the two bias signals $\beta_1$ and $\beta_2$. The layer C neurons C1 through C8 perform summation operations on these input signals ($C_1=B_1W_{b1}+\beta_1, C_2=B_1W_{b2}+\beta_1, \ldots, C_8=B_8W_{b8}+\beta_2$) and produce intermediate signals $C_1$ through $C_8$. These intermediate signals $C_1$ through $C_8$ are weighted by their respective interlayer weights $W_{c1}$ through $W_{c8}$ and received by the layer D neurons D1 through D8. These intermediate signals $C_1W_{c1}, C_2W_{c2}, \ldots, C_8W_{c8}$ are modified in accordance with the functions $f_{D1}$ through $f_{D8}$ of the layer D neurons D1 through D8 (per the discussion regarding Equation (7) above) to produce intermediate signals $D_1$ through $D_8$.

The intermediate signals $D_1$ through $D_8$ are weighted by their respective interlayer weights $W_{d1}$ through $W_{d8}$ which, with the exception of weights $W_{d3}$ and $W_{d7}$, have values of unity. Weights $W_{d3}$ and $W_{d7}$ have values of negative one (−1). The resulting product signals $D_1W_{d1}, D_2W_{d2}, \ldots, D_8W_{d8}$ are received by the layer E neurons E1 through E6. Layer E neurons E1, E3, E4 and E6 have gains of unity and produce from their respective input signals $D_1W_{d1}, D_4W_{d4}, D_5W_{d5}$ and $D_8W_{d8}$ further intermediate signals $E_1$ through $E_3$, $E_7$ through $E_{12}$ and $E_{16}$ through $E_{18}$ (where $E_1=E_2=E_3$, $E_7=E_8=E_9$, $E_{10}=E_{11}=E_{12}$ and $E_{16}=E_{17}=E_{18}$). Layer E neurons E2 and E5 receive their respective input signals $D_2W_{d2}$, $D_3W_{d6}$ and $D_7W_{d7}$, perform summation operations and provide intermediate signals $E_4$ through $E_6$ and $E_{13}$ through $E_{15}$ (where $E_4=E_5=E_6$ and $E_{13}=E_{14}=E_{15}$).

The neurons of layers A through E establish the membership functions 18. The membership functions 18 are established by taking the outputs of the layer E neurons 18a ($E_1$ [or $E_2$ or $E_3$]) through 18f ($E_{18}$ [or $E_{16}$ or $E_{17}$]) with respect to the network inputs 12a ($X_1$) and 12b ($X_2$). (For purposes of simplification, only membership function signals 18a, 18b, 18e and 18f have been labelled.) Thus, the membership functions 18 can be extracted for later use, e.g. by computing and storing the values of the outputs 18 versus inputs 12 functions (see e.g. FIG. 7).

The layer F neurons F1 through F9 serve as the rule base neurons and each perform multiplication, or product, operations on their respective input signals. For example, as shown, layer F neuron F1 receives and multiplies its input signals $E_1W_{e1}$ and $E_{10}W_{e10}$. Similarly, neuron F2 forms the product of its two input signals $E_2W_{e2}$ and $E_{12}W_{e13}$, and so on through neuron F9. Resulting product signals $F_1$ through $F_9$ are multiplied by their respective interlayer weights $W_{f1}$ through $W_{f9}$, with the resulting product signals $F_1W_{f1}$, $F_2W_{f2}, \ldots, F_9W_{f9}$ received by the layer G neuron. The layer G neuron performs a summation of all of these product signals to produce the final output signal Z.

The output layer weights 16a ($W_{f1}$) through 16i ($W_{f9}$) between the layer F and G neurons form the consequents of the fuzzy logic rules 16. The antecedents for the fuzzy logic rules 16 are formed by FUZZY($E_1$) through FUZZY($E_{18}$), where the function FUZZY($E_N$) represents the value of layer E output $E_N$ (where $N \in \{1,2,3,\ldots,18\}$) based upon the input XM (where $M \in \{1,2\}$) in accordance with the membership functions (discussed above). Accordingly, a typical rule for the configuration of FIG. 5 is: "If X1 is FUZZY(E1) [e.g. "L" per FIG. 3], and X2 is FUZZY(E10) [e.g. "L" per FIG. 3], then the output is $W_{f1}$." Thus, the fuzzy logic rules 16 can be extracted for later use by storing the values of the output layer weights 16a ($W_{f1}$) through 16i ($W_{f9}$).

Figure 6:
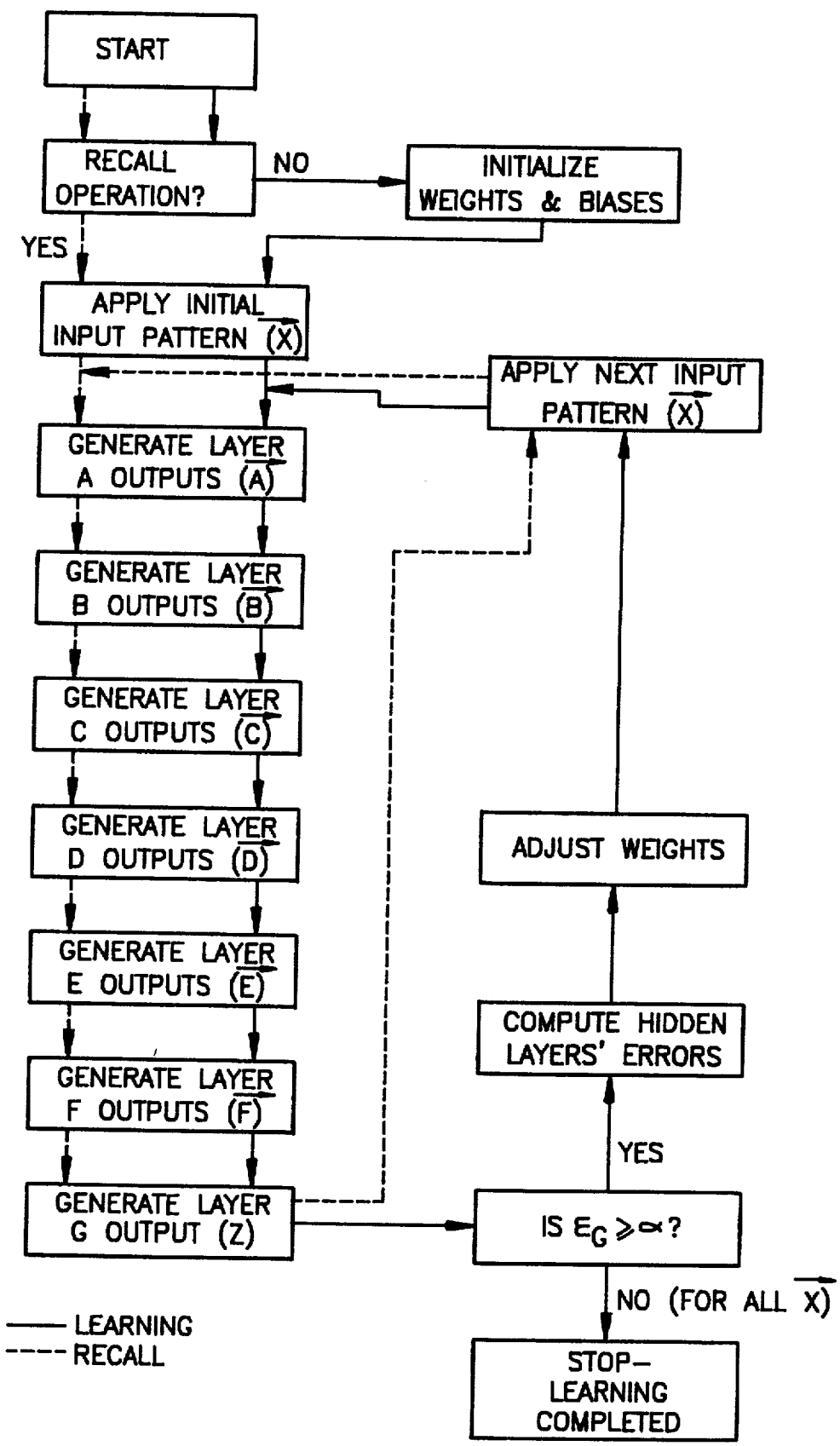
FIG. 6 illustrates a flowchart for neural network learning and Recall operations in accordance with the present invention.

Referring to FIG. 6, the operation of the neural network of FIG. 5 can be visualized in accordance with the illustrated flowchart. First, the interlayer weights $\vec{W}_a$, $\vec{W}_b$, $\vec{W}_c$, $\vec{W}_f$ and biases $\beta_1$ and $\beta_2$ are initialized. Then, the layer A neurons A1, A2 receive the input signals $X_1$ and $X_2$, and generate the layer A outputs $\vec{A}$. The layer B neurons B1, B2 receive their respective input signals $\vec{AW}_a$ and generate the layer B neuron output signals $\vec{B}$. The layer C neurons C1 through C8 receive their respective input signals $\vec{BW}_b$, $\beta_1$, $\beta_2$, and generate the layer C outputs $\vec{C}$. The layer D neurons D1 through D8 receive their respective input signals $\vec{CW}_c$ and produce, in accordance with their respective nonlinear functions $f_{D1}$ through $f_{D8}$, the layer D outputs $\vec{DW}_d$. The layer E neurons E1 through E6 receive their respective inputs $\vec{DW}_d$ and generate the layer E outputs $\vec{E}$. The layer F neurons F1 through F9, the rule base neurons, receive their respective input signals $\vec{EW}_e$ and generate the layer F outputs $\vec{F}$. The layer G neuron receives signals $\vec{FW}_f$ and generates the layer G output Z.

In accordance with the discussion above regarding Equation (1), the output error $\epsilon_G$ is then computed and compared against a selected reference, or threshold, error value $\alpha$. If the output error $\epsilon_G$ is greater than or equal to the threshold $\alpha$, the equivalent errors $\epsilon_n$, for each of the hidden layers are computed in accordance with the discussion above regarding Equations (3) and (5). Following this, the interlayer weights $\vec{W}_a$, $\vec{W}_b$, $\vec{W}_c$, $\vec{W}_e$ and $\vec{W}_f$ are adjusted. (The interlayer weights $\vec{W}_3$ are not modified, but are kept at their original values of unity or negative one [−1].)

The foregoing steps are repeated until such time as the output error $\epsilon_G$ is less than the selected threshold error $\alpha$ for all input training patterns $\vec{X}$. Once $\epsilon_G < \alpha$ for all $\vec{X}$, the learning operation is complete.

Rule evaluation (fuzzy inferencing) and defuzzification are combined to form a single operation. As discussed further below, this single operation does not use any division, unlike conventional defuzzification such as COG. Accordingly, such defuzzification saves time and is more accurate since it is based on neural network learning, where accuracy can be controlled during learning by selecting the desired error criterion. This Defuzzification is performed as follows:

$$Z = \sum_j o_j W_{jk} \qquad (9)$$

where:

Z=defuzzified output of neural network $O_j$=output of rule base layer neuron j $W_{jk}$=weight between rule base layer neuron j and output layer neuron k The defuzzified output Z includes the contribution from all of the rules within the rule base layer of neurons and matches the behavior of the neural network. Hence, this defuzzification (e.g. "neural defuzzification") is optimal, particularly since it does not require a division operation. This is to be contrasted with the conventional COG defuzzification operation, which is defined as follows:

$$Z = \left(\sum_i v_i V_i\right) / \left(\sum_i v_i\right) \quad (10)$$

where:

$v_i$=membership function i $V_i$=universe of discourse i i=index for universe of discourse (dependent upon number of output membership functions, shape of output membership functions and application)

In COG defuzzification, the index "T" for the universe of discourse can be more than the number of rules. On the other hand, in neural defuzzification according to the present invention, the summation index "j" is limited to the number of rules. Therefore, on the average, neural defuzzification has fewer multiplication operations, as well as no division operation.

As should be understood from the foregoing discussion, such neural defuzzification is actually a form of rule evaluation. Since the output of the rule is a "nonfuzzy" number, actual defuzzification is not required. Therefore, the terminology neural rule evaluation, rather than neural defuzzification, can also be used.

A qualitative example of the foregoing would be as follows. Referring back to FIG. 5, if one input 12a ($X_1$) was "low" (L) and the other input 12b ($X_2$) was "low" (L), then the output 14 (Z) would be represented by the product $F_1 W_{f1}$ (of the output $F_1$ and output weight $W_{f1}$ of the first layer F neuron F1).

Quantitatively, the neural network implementation and operation of FIGS. 4 and 5, respectively, have been simulated with very encouraging results. By way of example, one simulation involved the following highly nonlinear analog function:

$$Y = 2X_1^3 + 3X_2^2 - 1 \quad (11)$$

where $X_2 = 2X_1$ has been used to simplify the example.

The corresponding input signal data $X_1$, $X_2$, the resulting output Y, the learning rate η, learning factor and accuracy factor α used in this simulation are shown below in Table 2.

TABLE 2

| Learning Rate (η) = 0.01 Learning Factor = 0.20 Accuracy Factor (α) = 0.008 | | |
|---|---|---|
| INPUT 1 X1 | INPUT 2 X2 | OUTPUT Y |
| −2.10 | −4.20 | 33.40 |
| −1.70 | −3.40 | 23.85 |
| −1.30 | −2.60 | 14.89 |
| −0.90 | −1.80 | 7.26 |
| −0.50 | −1.00 | 1.75 |
| −0.10 | −0.20 | −0.88 |
| 0.30 | 0.60 | 0.13 |
| 0.70 | 1.40 | 5.57 |
| 1.10 | 2.20 | 16.18 |
| 1.50 | 3.00 | 32.75 |
| 1.90 | 3.80 | 56.04 |
| 2.10 | 4.20 | 70.44 |

In accordance with the foregoing discussion, the learning factor determines the learning rates within the inner layers of neurons, while the learning rate η corresponds to the output layer only. After the neural net has converged with the applied data to an accuracy factor α as indicated in Table 2 using seven input membership functions for each input, the fuzzy logic rules are generated (using the layer F neurons' outputs $F_1$ through $F_9$ and output weights $W_{f1}$ through $W_{f9}$). The resulting fuzzy logic rules for this example are shown below in Table 3.

TABLE 3

| X1=\X2= | LH | MH | SH | MD | SL | ML | LL |
|---|---|---|---|---|---|---|---|
| LH | 8.79 | 14.58 | 11.36 | 0.04 | 0.01 | 0.01 | 0.01 |
| MH | 14.58 | 3.62 | 9.86 | 0.20 | 0.01 | 0.01 | 0.01 |
| SH | 11.36 | 9.86 | 22.93 | 19.68 | 0.07 | 0.01 | 0.01 |
| MD | 0.04 | 0.20 | 19.68 | −1.63 | 4.46 | 0.66 | 0.07 |
| SL | 0.01 | 0.01 | 0.07 | 4.46 | 9.26 | 1.06 | 0.89 |
| ML | 0.01 | 0.01 | 0.01 | 0.66 | 1.06 | 5.89 | 11.53 |
| LL | 0.01 | 0.01 | 0.01 | 0.07 | 0.89 | 11.53 | 13.47 | where:

LH=large high

MH=medium high

SH=small high

MD=medium

SL=small low

ML=medium low

LL=large low and where "large", "medium", "small", "high" and "low" are relative qualitative parameters (e.g. fuzzy variables).

EXAMPLE: If input X1 is SH and input X2 is MH, then output is 9.86.

Figure 7:
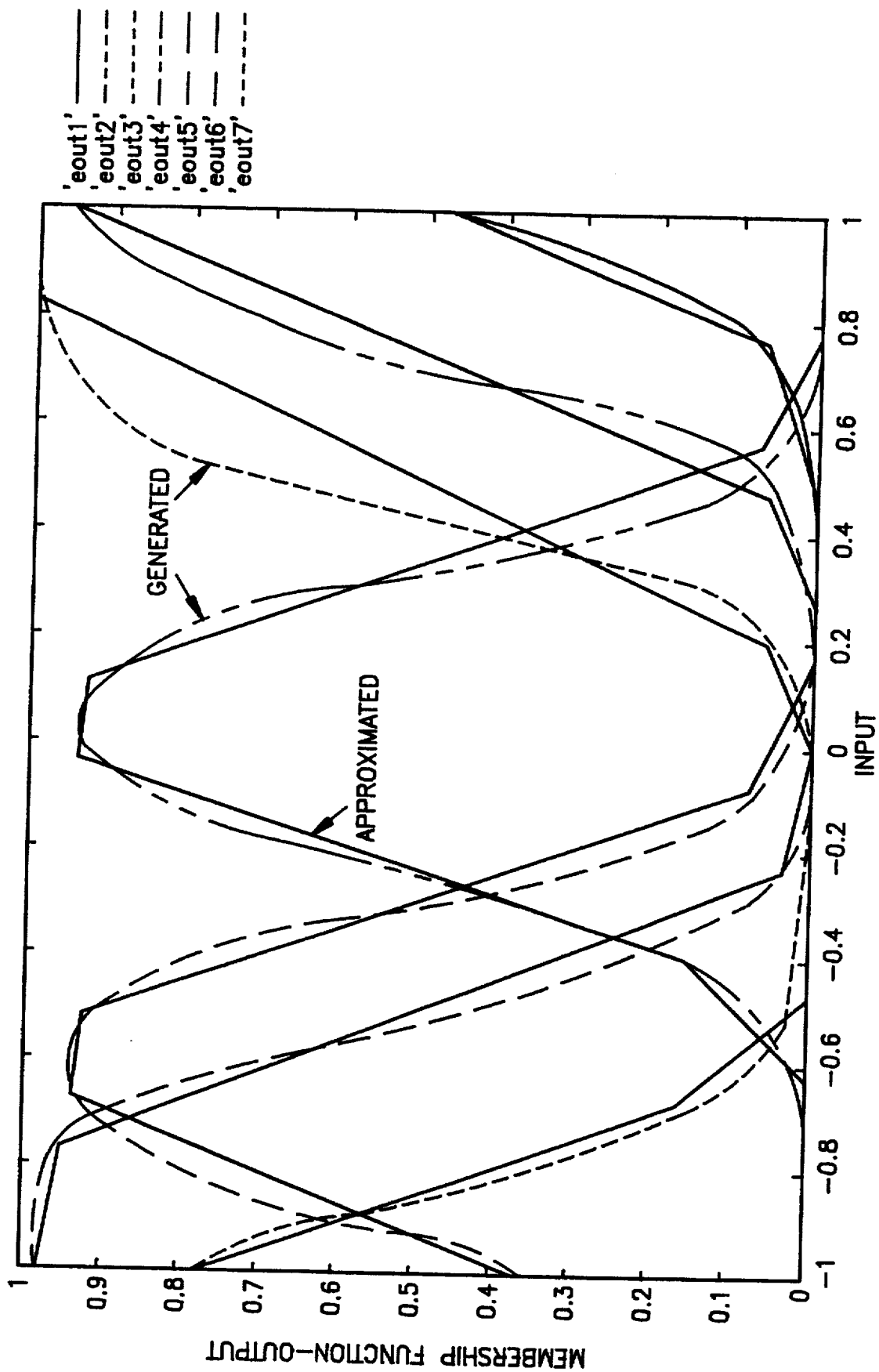
FIG. 7 illustrates an exemplary input membership function.

The data shown in Table 3 are numbers, i.e. singletons, as opposed to fuzzy numbers as used in conventional fuzzy logic. The shape of the input membership functions for input 1 ($X_1$) is shown in FIG. 7, and is generated by the neural network. The shape of the membership function for input 2 ($X_2$) is similar since input $X_1$ and X2 are related by Equation (11) above. Accordingly, the two-input, one-output system generated $7^2$=49 rules. The number of rules was reduced, i.e. optimized, to 25 using a "fuzzy rule verifier" which, as discussed further below, is basically a fuzzy logic system using the above-described neural network techniques. A set of Recall inputs was used along with the generated fuzzy logic rules and membership functions for both the nonoptimized (49 rules) and optimized (25 rules) cases. The resulting computed outputs are shown below in Table 4.

TABLE 4

| Input 1 X1 | Input 2 X2 | Comp'd Out (49 Rules) | Comp'd Out (25 Rules) |
|---|---|---|---|
| −2.100 | −4.200 | 33.321 | 33.321 |
| −1.900 | −3.800 | 28.594 | 28.594 |
| −1.500 | −3.000 | 19.245 | 19.245 |
| −1.100 | −2.200 | 10.805 | 10.805 |
| −0.700 | −1.400 | 4.212 | 4.212 |
| −0.300 | −0.600 | 0.016 | 0.016 |
| 0.100 | 0.200 | −0.836 | −0.836 |
| 0.500 | 1.000 | 2.199 | 2.197 |
| 0.900 | 1.800 | 10.063 | 10.059 |
| 1.300 | 2.600 | 23.697 | 23.694 |
| 1.700 | 3.400 | 43.508 | 43.507 |
| 2.100 | 4.200 | 70.397 | 70.397 |

From the foregoing, a number of observations can be made. First, the result of the antecedent processing, rule evaluation and defuzzification using all of the possible fuzzy logic rules (i.e. all 49 rules) and membership functions generated in accordance with the present invention is substantially equal to the values generated in a neural network Recall operation (column 3). Further, it can be shown that using even fewer than 49 rules (e.g. 25 rules per column 4) will produce comparable results. This is advantageous in that it takes substantially less time, as well as less memory, to compute the output.

It can be seen by looking at the shape of the membership functions (e.g. FIG. 7) that implementing such membership functions on high end processors is not difficult. Moreover, for low end processors, such membership function shapes can be reasonably approximated to convenient geometric shapes, such as triangles or trapezoids. Such approximations can yield reasonably accurate defuzzified outputs.

Figure 8:
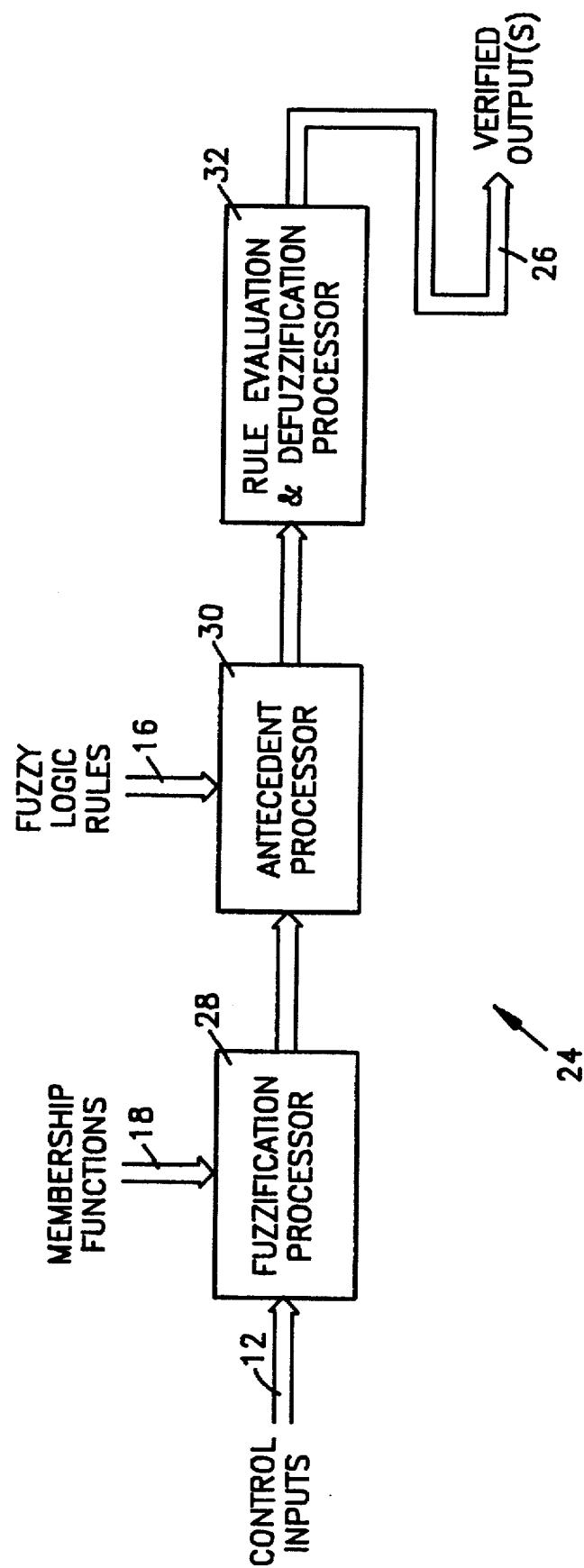
FIG. 8 depicts a fuzzy rule verifier and fuzzy system simulator suitable for use with the present invention.

Referring to FIG. 8, a fuzzy rule verifier 24 suitable for use with the present invention evaluates the fuzzy logic rules 16 and membership functions 18 generated by the fuzzy rule generator 10 of FIG. 1. The inputs to the fuzzy rule verifier 24 are the fuzzy logic rules 16, membership functions 18 and inputs 12 for which the verified output 26 needs to be computed. (The fuzzification processor 28, antecedent processor 30, and rule evaluation and defuzzification processor 32 can be constructed in the form of a multilayer neural network and operated in accordance with the discussion above regarding FIGS. 3, 4 and 5.)

To verify the fuzzy logic rules 16 and membership functions 18, the verified output 26 of the fuzzy rule verifier 24 is compared with the desired outputs 14. Some of the desired outputs 14', as discussed above, were used during the initial neural network training phase. The other desired outputs 14" can be obtained either by more measurements, or by performing a forward calculation on the learned neural network 10a (FIG. 3). (The latter can be done by performing a Recall operation within the fuzzy rule generator 10.)

From the foregoing, a number of observations can be made. The fuzzy rule verifier 24 can verify whether the computed output 26 from the defuzzification process for a set of inputs is the same as that obtained from a Recall operation through the fuzzy rule generator 10. This can check directly the accuracy of the generated fuzzy logic rules 16 and membership functions 18 provided by the fuzzy rule generator 10. Since the fuzzy rule generator 10 has the capability to reduce the number of fuzzy logic rules 16' methodically, a fuzzy rule verifier 24 can be used to verify whether the resulting defuzzified output 26 using fewer fuzzy logic rules 16' is sufficiently close to the value otherwise obtained from the Recall operation. Additionally, if approximated membership functions 18' are used, e.g. with more convenient geometric shapes, the fuzzy rule verifier 24 can be used to compute the resulting approximated defuzzified output 26' and compare it with the output 26 generated from the Recall operation. This way, acceptable results can be ensured while still allowing for the use of approximated membership functions 18'.

After the optimum number of fuzzy logic rules 16" and membership functions 18" has been determined (including the shapes of the membership functions) using the fuzzy rule verifier 24, a fuzzy logic system design can be completed. The completed design can then be implemented on a chosen processor. A conventional automated code converter can be used to take the fuzzy logic rules and the shape of the input membership functions and generate assembly code therefrom that can be executed by the chosen processor.

From the foregoing, it can be seen that the present invention advantageously combines beneficial attributes of neural networks and fuzzy logic, e.g. the adaptability, or learning capability, of the former and the simplicity of the latter. In doing so, the present invention provides an improved technique for applying neural networks to the design and implementation of fuzzy logic. However, further advantages can be realized by introducing "recurrency". Recurrency preserves temporal information and yields improved performance for context-dependent applications, while also reducing convergence time (which can be particularly beneficial in pattern recognition applications).

Figure 9:
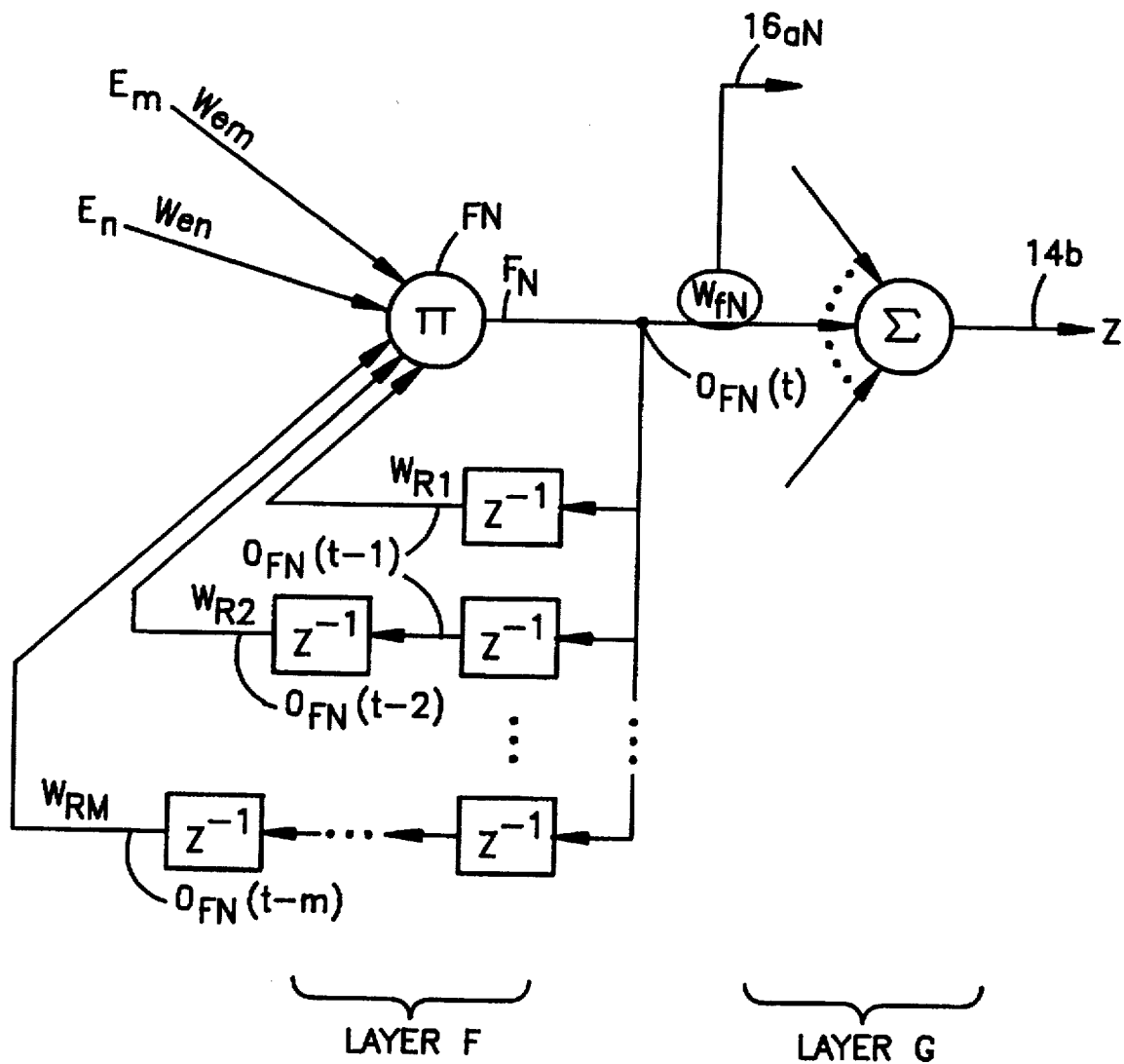
FIG. 9 illustrates a neuron for use in the neural network of FIG. 5 for implementing a recurrent neural network-based fuzzy logic system in accordance with the present invention.

Referring to FIG. 9, recurrency can be introduced by modifying the F-layer neurons FN in the neural network of FIG. 5 to add feedback paths, each of which includes at least one unit time delay element $Z^{-1}$ and an interneural weight $W_{Rm}$. For example, by feeding back the output $O_{FN}(t)$ through a feedback path with a unit time delay element $Z^{-1}$ and an interneural weight $W_{R1}$ the result $O_{FN}(t-1)$ would correspond to the prior state of the output $F_N$. Similarly, by feeding back the output $F_N$ through another feedback path with two unit time delay elements ($Z^{-1}$, $Z^{-1}$) and another interneural weight $W_{R2}$ the result $O_{FN}(t-2)$ would correspond to the two-unit delayed state of the output $F_N$ (and so on up through a feedback path with M unit time delay elements ($Z^{-1}, Z^{-1}, \ldots, Z^{-1}$) and an interneural weight $W_{RM}$ where the result $O_{FN}(t-M)$ would correspond to the Mth prior state of the output $F_N$).

The time-delayed feedback signals $O_{FN}(t-1)W_{R1}$, $O_{FN}(t-2)W_{R2}$, $O_{FN}(t-3)W_{R3}$, ..., $O_{FN}(t-M)W_{RM}$ serve as further antecedent signals, i.e. in addition to the original antecedent signals $E_m W_{em}$ and $E_n W_{en}$, for the neuron FN. (These "new" antecedent signals $O_{FN}(t-1)W_{R1}$, $O_{FN}(t-2)W_{R2}$, $O_{FN}(t-3)W_{R3}$, ..., $O_{FN}(t-M)W_{RM}$, as time-delayed versions of the output $O_{FN}(t)$, represent the context of the signal.) The output signal $O_{FN}(t)$ serves as the consequent signal for the neuron FN. The training and recall operations of the overall neural network would be accomplished consistent with the foregoing discussion. For example, in accordance with the discussion above regarding Equations (2) and (3), the recurrent connection weights $W_{Ri}$ and equivalent error $\epsilon$ are modified, or updated, as follows.

$$W_{Ri(new)} = W_{Ri(old)} + \eta \epsilon_{FN}(t) O_{FN}'(t) \quad (12)$$

$$\epsilon_{FN}(t) = f_j' \sum_j \epsilon_{G,k} W_{FN,k} \quad (13)$$

Where:

$W_{Ri}$ =recurrent connection weight i=1, 2, 3, ..., M

η=learning rate $\epsilon_{FN}(t)$=equivalent error at neuron FN $\epsilon_{FN}(0)$=zero $O_{FN}'$ (t)=first derivative of function of output of neuron FN $\epsilon_{G,k}$=equivalent error at output of kth neuron in layer G k=1, 2, 3, ..., N $f_j'$=first derivative of the function of middle (hidden) layer neuron j $$O_{FN}(t) = E_m W_{em} \cdot E_n W_{en} \cdot \prod_{i=1}^{M} (1 + O_{FN}(t-i)W_{Ri}) \quad (14)$$

Based upon the forgoing discussion, it should be appreciated that, due to the introduction of recurrency, the format of the fuzzy logic rule becomes as follows:

If input X1=SH, input X2=MH, output O(t−M)=$W_M$, ..., and output O(t−1)=$W_{R1}$, then output O(t)=$W_{FN}$.

Advantages offered by introducing recurrency into a neural network-based, fuzzy logic system can also be realized by introducing another type of recurrency into a neural fuzzy system. For example, in accordance with another embodiment of the present invention, a recurrent architecture can be realized by adding a feedback loop from the output layer to the input layer during the recall mode of operation. With this modification, the neural fuzzy system can be used to implement a Fuzzy Finite State Machine (FFSM).

A FFSM differs from a conventional finite state machine (FSM) in that the inputs, present states and next states are represented using fuzzy sets rather than the "crisp" inputs and states of a traditional crisp FSM. The output function and state transition function of the FSM are replaced by the fuzzy rules which determine the outputs and govern the transitions of the FFSM between the fuzzy states. The fuzzification of FSM results in data reduction (e.g. less memory needed to implement the FFSM) as well as more robust operation (e.g. less susceptible to system parameter changes or noise).

Further, with this approach, reconfiguration of the artificial neural network (ANN) of the neural fuzzy system is not required since it is trained with the state transition table and implementation of a new FFSM is achieved directly with the training data. This increases the reliability and facilitates the design and implementation of a FFSM using a microcontroller.

A FFSM is a synchronous sequential machine which can be defined as quintuple following the crisp FSM definition:

$$FFSM = (I, O, S, f, g) \quad (15)$$

where:

I=finite, nonempty set of fuzzy inputs
O=finite, nonempty set of fuzzy outputs
S=finite, nonempty set of fuzzy states
f=state transition function (f: I X S→S)
g=output function (g: I X S→O)

The Cartesian product IXS contains all pairs of fuzzy elements (u(t), x(t)). The state transition function f maps each fuzzy pair (u(t), x(t)) onto a fuzzy next state x(t+1) in S, and the output function g maps each fuzzy pair (u(t), x(t)) onto a fuzzy output y(t) in O in accordance with the following:

$$x(t+1) = f(x(t), u(t)) \quad (16)$$

and $$y(t) = g(x(t), u(t)) \quad (17)$$

where:

x(t)=fuzzy present state
u(t)=fuzzy input
x(t+1)=fuzzy next state
(FFSM defined only at discrete times t=0, 1, 2, . . . .)

A Moore type of FFSM is employed in this discussion for the sake of convenience since the neural fuzzy system discussed above has one output. However, it should be understood that the principles discussed herein can be extended to other types of FFSMs as well, e.g. a Mealy type. The output of a Moore machine is a function of the present state:

$$y(t) = g(x(t)) \quad (18)$$

Note that, in a Mealy machine, the output is a function of both the present state and the input. For both machine types, the next state depends on both the input and the present state as seen in Equation (16).

In general, the state transition function f, and the output function g (given in Equations (16) and (17), respectively) can be represented using fuzzy rules in the following format:

If Input=u(t) and PresentState=x(t) then NextState=x(t+1)  (19)

If Input=u(t) and PresentState=x(t) then Output=y(t)  (20)

where:

$\mu_{u(t)}$=membership function for fuzzy input u(t)
$\mu_{x(t)}$=membership function for fuzzy present state x(t)
$\mu_{x(t+1)}$=membership function for fuzzy next state x(t+1)

Note that the derivation of the fuzzy rules (given in Equations (19) and (20)) and the associated membership functions is not trivial. The task is to transform the crisp FSM into the corresponding FFSM. This requires the partitioning of the crisp states and the crisp inputs into clusters (fuzzy sets) and generate the associated membership functions using the state transition table that corresponds to the crisp FSM. This is achieved by means of the ANN in the neural fuzzy system.

As discussed above, the neural fuzzy system includes four elements: (1) a feed-forward ANN; (2) a fuzzy rules and membership function generator (FRMFG); (3) a fuzzy rule verifier and optimizer (FRVO); and (4) an automatic code converter (ACC). Supervised learning is employed to train the ANN. A modified backpropagation algorithm is used to learn the input output relationship for a given system. The ANN has two inputs, one output and five hidden layers. The architecture of the ANN explicitly maps to the fuzzy logic structure, and the connection structure along with the weights directly define the fuzzy rules and the membership functions. The FRMFG extracts the fuzzy rules and the membership functions when the ANN converges to a minimum energy state. The validity of the solution can be verified by the FRVO and the solution can be optimized by eliminating the fuzzy rules that do not contribute to the result significantly. This way the output error can be controlled and kept at tolerable levels (which is not a trivial task when an ANN is not utilized to obtain the fuzzy system). Finally, the ACC generates a program which corresponds to the fuzzy system.

Figure 10:
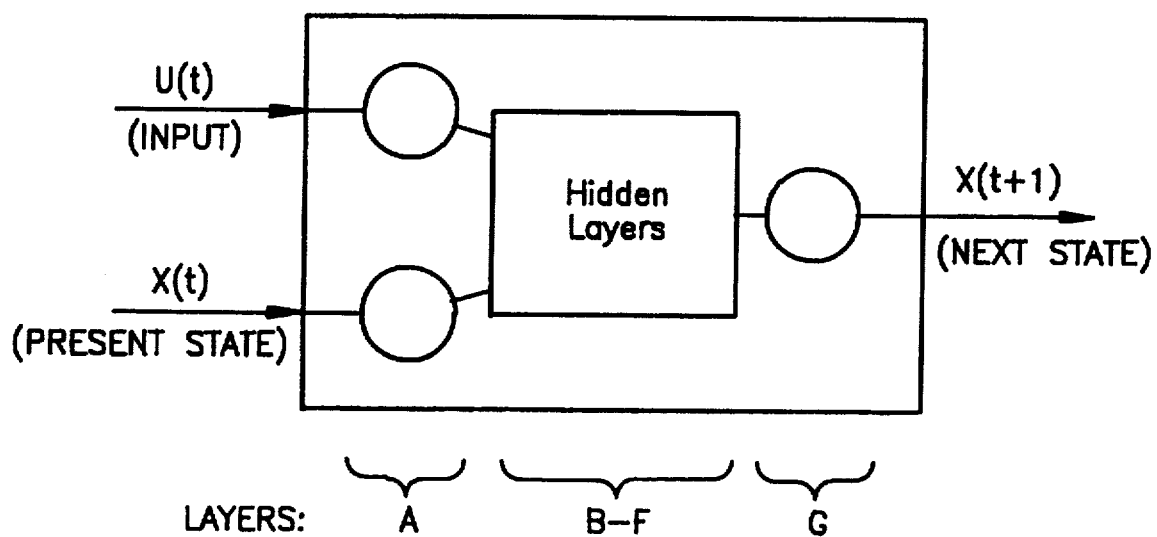
FIG. 10 illustrates a neural network-based finite state machine in its training mode for implementing a neural network-based fuzzy logic finite state machine in accordance with the present invention.

Referring to FIG. 10, during the training phase, one input of the ANN is used for the external input U(t), and another input is used for the present state X(t). The output of the ANN is used for the next state X(t+1). (In this example there is no need to use separate outputs for the next state X(t+1) and the external output Y(t) of the FSM since a Moore type of FFSM is implemented.)

Figure 11:
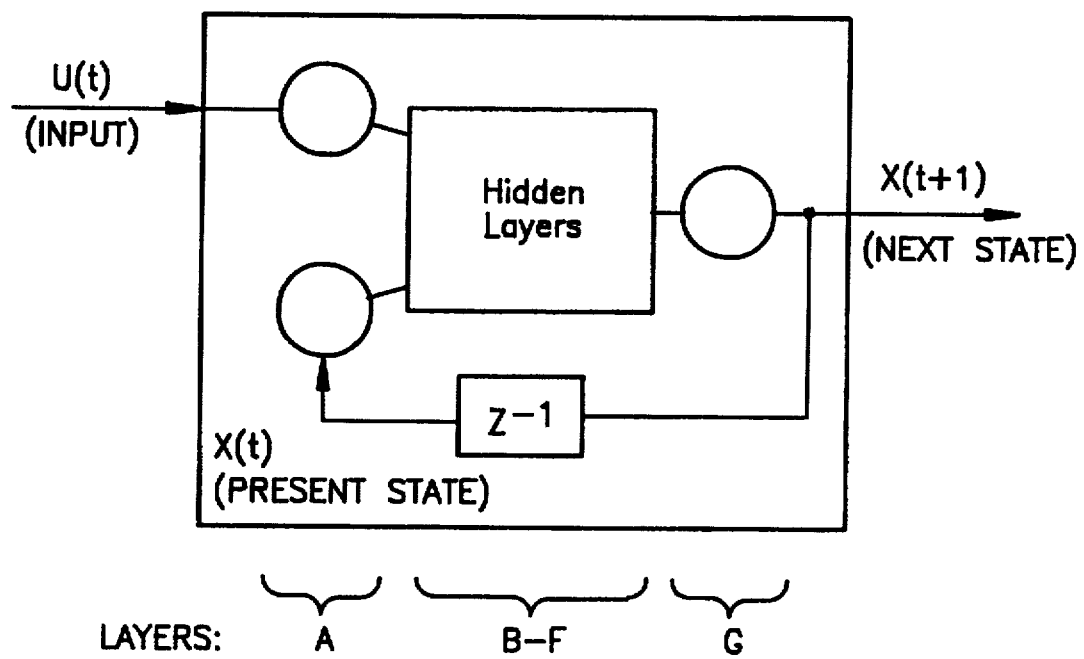
FIG. 11 illustrates the neural network-based finite state machine of FIG. 10 in its recall mode.

Referring to FIG. 11, once the training is completed, the output X(t+1) is fed back to the present state input X(t) through a unit delay $Z^{-1}$. Thus, the architecture of the neural fuzzy system is changed from a feed-forward structure to a recurrent architecture during the recall mode. A comparator can be used at the output to determine whether the system is at the final state. (Note that the output y(t) is zero in all states except the final state.)

The defuzzification in the neural fuzzy system can be summarized as:

$$X(t+1) = \sum_{i=1}^{M} \mu_{i,u}(U(t)) \cdot \mu_{i,x(t)}(X(t)) \cdot \mu_{i,x(t+1)}(X(t+1)) \quad (21)$$

where:

M=total number of fuzzy rules
$\mu_u$=membership function for fuzzy input u(t)
$\mu_{x(t)}$=membership function for fuzzy present state x(t)
$\mu_{x(t+1)}$=membership function for fuzzy next state x(t+1)
Capitalized "U", "X(t)" and "X(t+1)" represent crisp values.
Singletons are used for the next state.

Addition and multiplication are used for disjunction and conjunction operations as shown in Equation (21).

Figure 12:
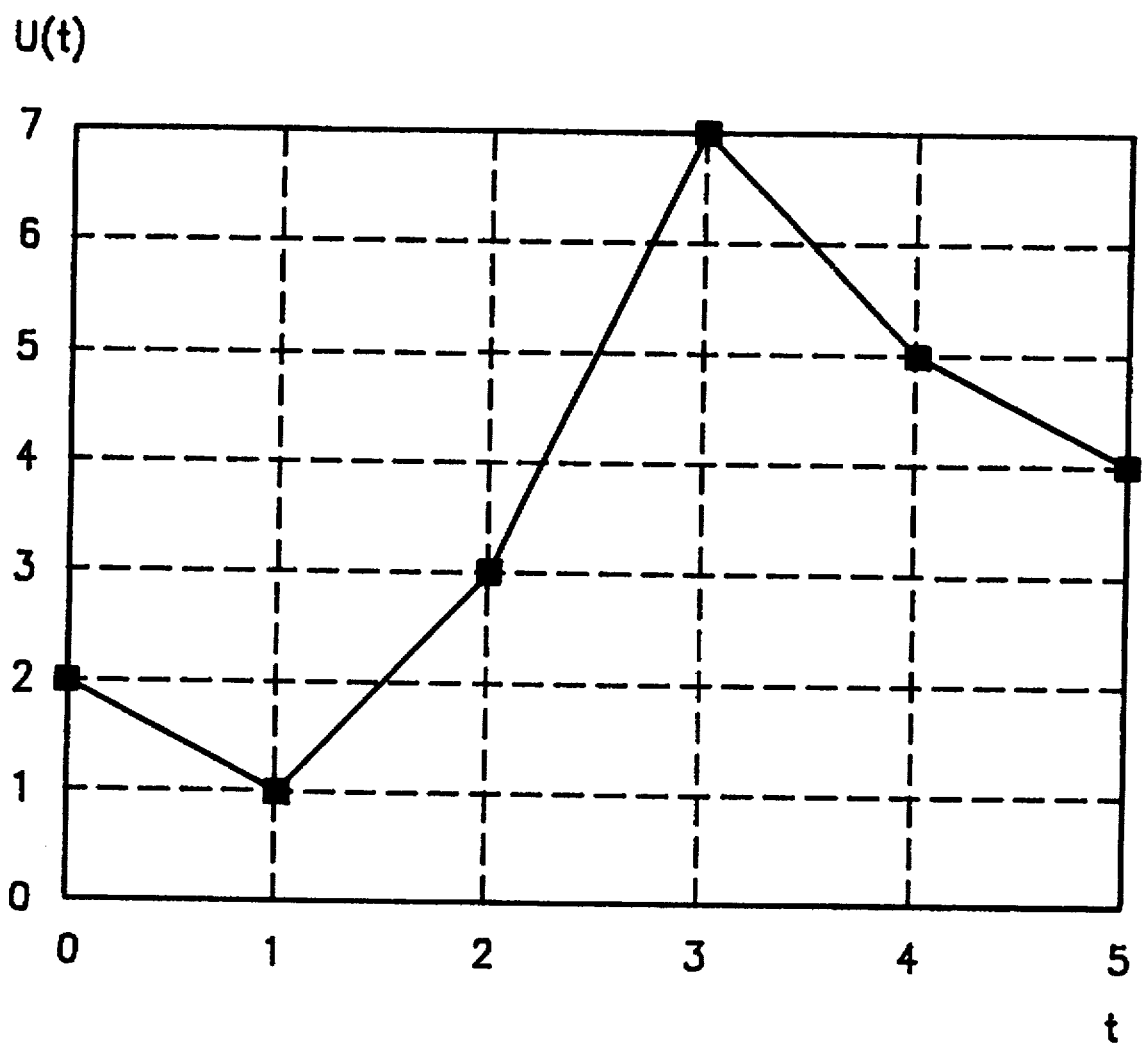
FIG. 12 illustrates an exemplary temporal pattern used for testing a neural network-based fuzzy logic finite state machine in accordance with the present invention.
Figure 13:
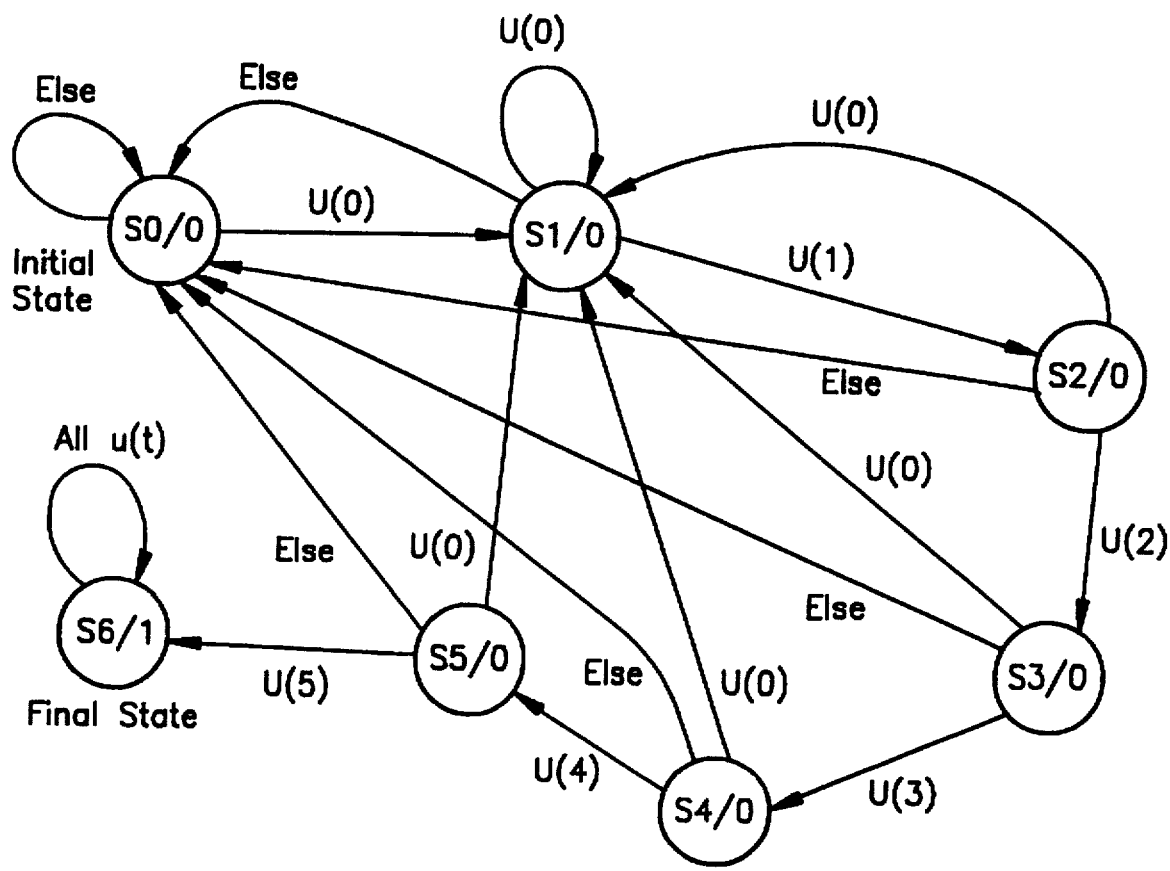
FIG. 13 is a state transition diagram used for recognizing the exemplary temporal pattern of FIG. 12.

Referring to FIGS. 12 and 13 and Table 5 below, a Moore type of FFSM in accordance with the foregoing can be used to recognize a temporal pattern such as that shown (FIG. 12). First, a state transition diagram (FIG. 13) and a corresponding state transition table (Table 5) are derived to recognize the given temporal pattern. The FFSM changes from a fuzzy state to another fuzzy state depending on the temporal pattern sample values arriving at discrete instances. There is an initial state S0 at which the system waits for the specified temporal pattern. The initial state is resumed each time the correct temporal sequence is broken. The final state S6 is reached when the entire temporal pattern is received. The FFSM stays in S6 indefinitely until it is reset.

TABLE 5

State Transitions

| INPUT U(t) | PRESENT STATE X(t) | NEXT STATE X(t + 1) |
|---|---|---|
| U(0) | S0 | S1 |
| Else | S0 | S0 |
| U(0) | S1 | S1 |
| U(1) | S1 | S2 |
| Else | S1 | S0 |
| U(0) | S2 | S1 |
| U(2) | S2 | S3 |
| Else | S2 | S0 |
| U(0) | S3 | S1 |
| U(3) | S3 | S4 |
| Else | S3 | S0 |
| U(0) | S4 | S1 |
| U(4) | S4 | S5 |
| Else | S4 | S0 |
| U(0) | S5 | S1 |
| U(5) | S5 | S6 |
| Else | S5 | S0 |
| All | S6 | S6 |

The next step is the training of the ANN in the neural fuzzy system. Table 6 below contains the procedure to generate the training data set. Following this procedure, the numerical values are assigned to the states as listed below in Table 7. The numerical assignments can be arbitrary. However, to facilitate the convergence of the ANN in the neural fuzzy system, the assignments in Table 7 are chosen to minimize the variations between the next state values X(t+1) corresponding to the consecutive next states and inputs, as shown below in Table 8.

TABLE 6

Procedure to Generate Training Data

1. Devise state diagram
2. Generate state transition table from state diagram
3. Assign numerical values to states
4. Generate "Else" inputs within input range along with corresponding states

TABLE 7

Numerical State Assignments

| STATE | NUMERIC VALUE |
|---|---|
| S0 | 3 |
| S1 | 4 |
| S2 | 5 |

TABLE 7-continued

Numerical State Assignments

| STATE | NUMERIC VALUE |
|---|---|
| S3 | 6 |
| S4 | 2 |
| S5 | 7 |
| S6 | 1 |

TABLE 8

Training Data

| U | X(t) | X(t + 1) | U | X(t) | X(t + 1) |
|---|---|---|---|---|---|
| 0 | 3 | 3 | 4 | 6 | 3 |
| 1 | 3 | 3 | 5 | 6 | 3 |
| 2 | 3 | 4 | 6 | 6 | 3 |
| 3 | 3 | 3 | 7 | 6 | 3 |
| 4 | 3 | 3 | 0 | 2 | 3 |
| 5 | 3 | 3 | 1 | 2 | 3 |
| 6 | 3 | 3 | 2 | 2 | 4 |
| 7 | 3 | 3 | 3 | 2 | 3 |
| 0 | 4 | 3 | 4 | 2 | 3 |
| 1 | 4 | 5 | 5 | 2 | 7 |
| 2 | 4 | 4 | 6 | 2 | 3 |
| 3 | 4 | 3 | 7 | 2 | 3 |
| 4 | 4 | 3 | 0 | 7 | 3 |
| 5 | 4 | 3 | 1 | 7 | 3 |
| 6 | 4 | 3 | 2 | 7 | 4 |
| 7 | 4 | 3 | 3 | 7 | 3 |
| 0 | 5 | 3 | 4 | 7 | 1 |
| 1 | 5 | 3 | 5 | 7 | 3 |
| 2 | 5 | 4 | 6 | 7 | 3 |
| 3 | 5 | 6 | 7 | 7 | 3 |
| 4 | 5 | 3 | 0 | 1 | 1 |
| 5 | 5 | 3 | 1 | 1 | 1 |
| 6 | 5 | 3 | 2 | 1 | 1 |
| 7 | 5 | 3 | 3 | 1 | 1 |
| 0 | 6 | 3 | 4 | 1 | 1 |
| 1 | 6 | 5 | 5 | 1 | 1 |
| 2 | 6 | 4 | 6 | 1 | 1 |
| 3 | 6 | 3 | 7 | 1 | 1 |

Figure 14:
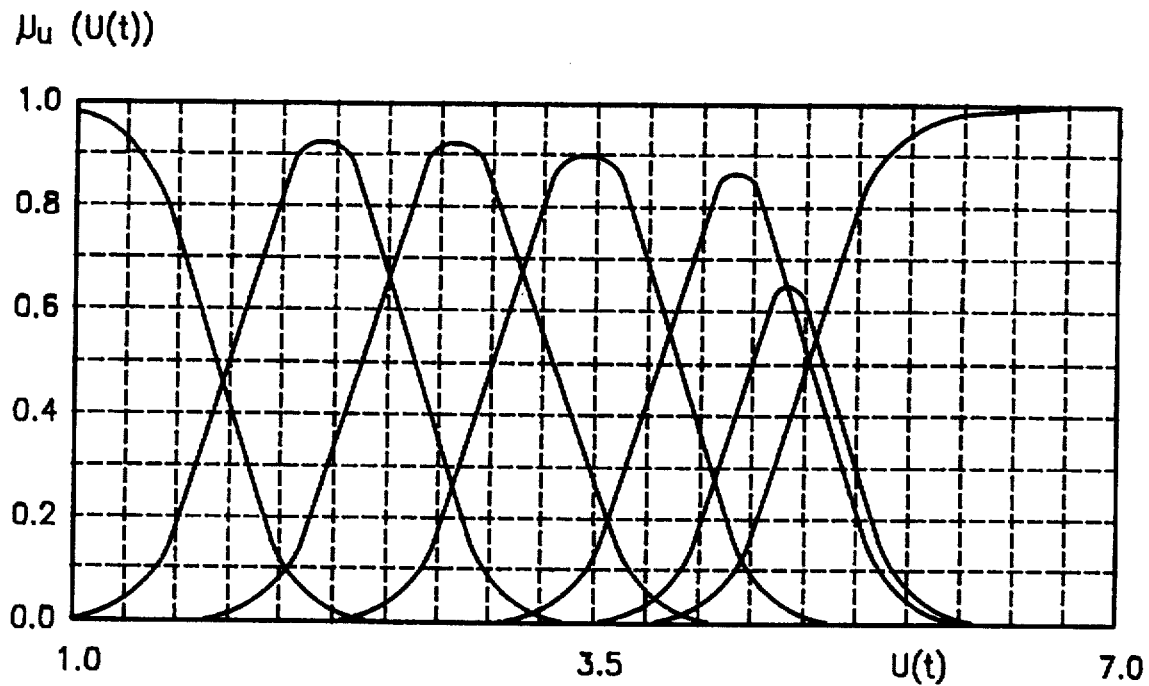
FIG. 14 illustrates the membership functions $\mu_{u(t)}(U(t))$ for the fuzzy external input u(t) to the neural network-based finite state machine of FIG. 10.
Figure 15:
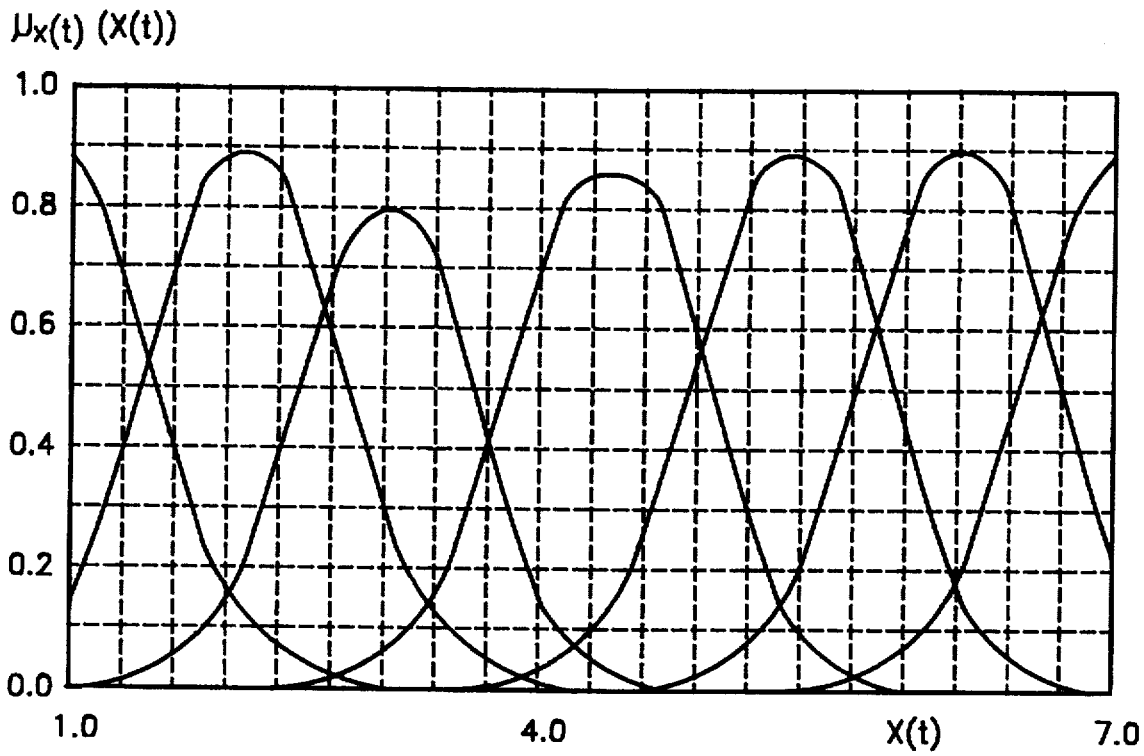
FIG. 15 illustrates the membership functions $\mu_{x(t)}(X(t))$ for the fuzzy present state signal x(t) to the neural network-based finite state machine of FIG. 10.

The parameters shown below in Table 9 are used for the training. It takes one hundred nine thousand, two hundred eighty-six (109,286) iterations for the ANN to converge with these parameters. The generated membership functions for the input u(t) and the present state x(t), and the fuzzy rules are given in matrix format in FIGS. 14 and 15 and Table 10, respectively. (As discussed further above, a corresponding assembler program code can then be generated.) The amount of memory required to implement this FFSM is 894 bytes (e.g. in the COP8 Microcontroller manufactured by National Semiconductor Corporation of Santa Clara, Calif.). The recognition rate of the FFSM is 100% when the input sample values are within the specified error range ($\epsilon$=0.01).

TABLE 9

Training Parameters

| Parameter | Value | Description |
|---|---|---|
| $\epsilon$ | 0.01 | Tolerated error |
| LR | 0.4 | Learning rate |
| LF | 0.08 | Learning factor |
| # MF u | 7 | Membership functions for Fuzzy input "u(t)" |
| # MF x(t) | 7 | Membership functions for Fuzzy present state "x(t)" |
| # Rules | 49 | Fuzzy logic rules |

TABLE 10

Fuzzy Rules
(Numerical values are truncated to two digits after decimal point.)

| u(t)\<br>x(t) | VLM | LM | MLM | MM | MHM | HM | VHM |
|---|---|---|---|---|---|---|---|
| VL | 0.74 | 2.66 | 2.20 | 3.18 | 2.66 | 2.20 | 2.91 |
| L | 0.68 | 2.33 | 2.49 | 6.77 | 1.17 | 6.05 | 1.62 |
| ML | 0.16 | 3.48 | 4.66 | −1.27 | 4.85 | −2.69 | 4.93 |
| M | 1.00 | −0.49 | −0.96 | 6.32 | 3.71 | 5.59 | −1.60 |
| MH | 0.51 | 3.78 | 6.47 | −0.11 | 0.97 | −0.37 | 1.85 |
| H | −1.14 | 8.14 | −4.02 | 2.52 | 1.30 | 1.92 | 0.86 |
| VH | 0.74 | 2.61 | 3.27 | 3.17 | 2.64 | 2.19 | 2.89 |

EXAMPLE: If u(t) is VH and x(t) is VHM then x(t+1) is 2.89 u(t)=Fuzzy input x(t)=Fuzzy present state (singleton values are for next state x(t+1))

VLM=Very Low Match

LM=Low Match

MLM=Medium Low Match

MM=Medium Match

MHM=Medium High Match

HM=High Match

VHM=Very High Match

Experimental results have shown that the foregoing approach can be quite effective, especially when cost is a primary concern. An important advantage of this approach is that the fuzzification of the states and input results in a reduction in the memory needed to implement the FFSM in a microcontroller. Furthermore, there is no need to write a separate or special program or design separate or special hardware to implement the FFSM. The training data corresponding to the state transition table can be used to implement the FFSM directly. This ensures the reliability of the operation. Also, additional flexibility (to control the transitions between the states) can be achieved by modifying the training set (e.g. by adding, deleting or changing training data). For example, changing noise characteristics can be considered to update the training data set when a FFSM is employed as an adaptive signal detection subsystem. Moreover, the above-discussed FFSM facilitates the design and implementation of a FFSM using a microcontroller and provides more robust response (less susceptibility to system parameter changes or noise).

In accordance with the foregoing, it should be appreciated that recurrency can be introduced into a neural-fuzzy controller in either of the two above-discussed manners, e.g. "externally" or "internally", to provide for the retention and use of context-sensitive knowledge. With external recurrency, i.e. with intra-system recurrency, a fuzzy finite state machine is created wherein knowledge of prior system states is used during recall operation. This allows the system to operate faster and more accurately, e.g. by classifying input patterns faster and more accurately. With internal recurrency, i.e. with intra-neuron recurrency, knowledge of prior system states is used during both training and recall operations, thereby providing for even more accurate system operation due to the finer, more precise system learning which takes place.

It should be understood that various alternatives to the embodiments of the present invention described herein can be employed in practicing the present invention. It is intended that the following claims define the scope of the present invention, and that structures and methods within the scope of these claims and their equivalents be covered thereby.

What is claimed is:

1. A neural network-based, fuzzy logic finite state machine comprising:

a neural network which includes a plurality of signal ports for receiving a plurality of input signals, including an external input signal and a present state signal, and providing in accordance therewith a next state signal; and a feedback path, coupled to multiple ones of said plurality of signal ports, for receiving and time-delaying said next state signal to provide said present state signal.

2. A neural network-based, fuzzy logic finite state machine as recited in claim 1, wherein said neural network comprises:

a first plurality of neurons for receiving and fuzzifying said plurality of input signals to provide a fuzzified plurality of input signals;

a second plurality of neurons, coupled to said first plurality of neurons, for receiving and processing said fuzzified plurality of input signals in accordance with a plurality of fuzzy logic rules to provide a plurality of output signals which corresponds to a plurality of fuzzy logic rule consequents; and an output neuron layer, coupled to said second plurality of neurons, for receiving and defuzzifying said plurality of output signals and in accordance therewith providing said next state signal.

3. A neural network-based, fuzzy logic finite state machine as recited in claim 7, wherein said feedback path is for delaying said next state signal by a unit time delay to provide said present state signal.

4. A neural network-based fuzzy logic finite state machine as recited in claim 1, wherein said plurality of signal ports is further for receiving a prior state signal as one of said plurality of input signals.

5. A neural network-based, fuzzy logic finite state machine as recited in claim 4, wherein said feedback path is further for receiving and delaying said next state signal by a plurality of unit time delays to provide said prior state signal.

6. A recurrent artificial neural network for generating pluralities of signals representing a plurality of fuzzy logic rules and a plurality of fuzzy logic membership functions, comprising:

first neural means for receiving a plurality of signals representing input data for an intelligent system and for providing fuzzified data which corresponds to said input data;

second neural means coupled to said first neural means for receiving said fuzzified data and in accordance therewith generating a plurality of membership signals which correspond to a plurality of fuzzy logic membership functions; and third neural means, including output-to-input feedback means and coupled to said second neural means, for receiving said plurality of membership signals and in accordance therewith recurrently generating a plurality of logic rule signals which represent a plurality of recurrent fuzzy logic rules;

wherein said first, second and third neural means cooperate together by performing a learning process with back-propagation of an output error signal, and wherein said output error signal is propagated serially back from an output of said third neural means through and successively processed by said third, second and first neural means.

7. A recurrent artificial neural network as recited in claim 6, wherein said third neural means multiplies selected ones of said received plurality of membership signals.

8. A recurrent artificial neural network as recited in claim 6, further comprising comparison means coupled to said third neural means for receiving therefrom an output signal representing a plant control signal, for receiving an input signal representing a desired control signal, and for comparing said input desired control signal with said output plant control signal and in accordance therewith generating said output error signal.

9. A recurrent artificial neural network as recited in claim 6, further comprising fourth neural means coupled to said third neural means for receiving and summing a plurality of signals therefrom to provide an output sum signal representing defuzzified data.

10. A recurrent artificial neural network as recited in claim 9, further comprising comparison means coupled to said fourth neural means for receiving therefrom said output sum signal, for receiving an input signal representing a desired control signal, and for comparing said input desired control signal with said output sum signal and in accordance therewith generating said output error signal, wherein said output sum signal represents a plant control signal.

11. A recurrent artificial neural network for generating pluralities of signals representing a plurality of fuzzy logic rules and a plurality of fuzzy logic membership functions, comprising:

a first plurality of artificial neurons which receive a plurality of signals representing input data for an intelligent system and provide fuzzified data which correspond to said input data;

a second plurality of artificial neurons, coupled to said first plurality of artificial neurons, which receive said fuzzified data and in accordance therewith generate a plurality of membership signals which correspond to a plurality of fuzzy logic membership functions; and a third plurality of artificial neurons, including output-to-input feedback for each one thereof and coupled to said second plurality of artificial neurons, which receive said plurality of membership signals and in accordance therewith recurrently generate a plurality of logic rule signals which represent a plurality of recurrent fuzzy logic rules, wherein said third plurality of artificial neurons includes a plurality of output weights corresponding to said plurality of logic rule signals;

wherein said first, second and third pluralities of artificial neurons cooperate together by performing a learning process with back-propagation of an output error signal, and wherein said output error signal is propagated serially back from an output of said third plurality of artificial neurons through and successively processed by said third, second and first pluralities of artificial neurons.

12. A recurrent artificial neural network as recited in claim 11, wherein said third plurality of artificial neurons multiply selected ones of said received plurality of membership signals.

13. A recurrent artificial neural network as recited in claim 11, further comprising a comparator, coupled to said third plurality of artificial neurons, which receives therefrom an output signal representing a plant control signal, receives an input signal representing a desired control signal, and compares said input desired control signal with said output plant control signal and in accordance therewith generates said output error signal.

14. A recurrent artificial neural network as recited in claim 11, further comprising an artificial neuron, coupled to said third plurality of artificial neurons, which receives and sums a plurality of signals therefrom to provide an output sum signal representing defuzzified data.

15. A recurrent artificial neural network as recited in claim 14, further comprising a comparator, coupled to said artificial neuron, which receives therefrom said output sum signal, receives an input signal representing a desired control signal, and compares said input desired control signal with said output sum signal and in accordance therewith generates said output error signal, wherein said output sum signal represents a plant control signal.

16. A computer-implemented method for recurrently generating pluralities of signals representing a plurality of fuzzy logic rules and a plurality of fuzzy logic membership functions, comprising the computer-implemented steps of:

receiving a plurality of signals representing input data for an intelligent system;

generating a plurality of fuzzified data signals representing fuzzified data which corresponds to said input data;

generating in accordance with said plurality of fuzzified data signals a plurality of membership signals which correspond to a plurality of fuzzy logic membership functions;

generating recurrently in accordance with said plurality of membership signals and a plurality of local feedback signals a plurality of logic rule signals which represent a plurality of recurrent fuzzy logic rules; and performing a learning process with back-propagation of an output error signal in cooperation with said steps of generating said pluralities of fuzzified data signals, membership signals and logic rule signals, wherein said back-propagation of said output error signal is performed following a completion of one iteration of said step of generating said plurality of logic rule signals and is performed successively and prior to subsequent iterations of said steps of generating said pluralities of fuzzified data signals, membership signals and logic rule signals.

17. A method as recited in claim 16, wherein said step of generating recurrently in accordance with said plurality of membership signals and a plurality of local feedback signals a plurality of logic rule signals which represent a plurality of recurrent fuzzy logic rules comprises outputting a plurality of weight signals corresponding to a plurality of output weights associated with a third plurality of artificial neurons, wherein said plurality of weight signals represent said plurality of logic rule signals.

18. A method as recited in claim 17, wherein said step of generating recurrently in accordance with said plurality of membership signals and a plurality of local feedback signals a plurality of logic rule signals which represent a plurality of recurrent fuzzy logic rules further comprises multiplying selected ones of said received plurality of membership signals.

19. A method as recited in claim 16, wherein said step of generating recurrently in accordance with said plurality of membership signals and a plurality of local feedback signals a plurality of logic rule signals which represent a plurality of recurrent fuzzy logic rules comprises multiplying selected ones of said received plurality of membership signals.

20. A method as recited in claim 16, further comprising the steps of:

providing an output signal representing a plant control signal;

receiving an input signal representing a desired control signal; and comparing said input desired control signal with said output plant control signal and in accordance therewith generating said output error signal.

21. A method as recited in claim 16, further comprising the steps of:

generating a plurality of output signals associated with said plurality of logic rule signals; and summing said plurality of output signals associated with said plurality of logic rule signals to provide an output sum signal representing defuzzified data.

22. A method as recited in claim 21, further comprising the steps of:

receiving said output sum signal, wherein said output sum signal represents a plant control signal;

receiving an input signal representing a desired control signal; and comparing said input desired control signal with said output sum signal and in accordance therewith generating said output error signal.

23. A recurrent artificial neural network for defuzzifying a plurality of fuzzy data generated in accordance with a plurality of fuzzy logic rules and membership functions, comprising:

rule-based recurrent neural means for receiving and recurrently processing a plurality of fuzzy signals representing fuzzified data which has been fuzzified in accordance with a plurality of fuzzy logic membership functions to provide in accordance therewith a plurality of recurrent processed fuzzy signals;

output weights means coupled to said rule-based recurrent neural means for receiving and weighting said plurality of recurrent processed fuzzy signals; and single output neuron means coupled to said output weights means for receiving and summing said plurality of weighted, recurrently processed fuzzy signals to provide an output signal representing defuzzified data.

24. A recurrent artificial neural network as recited in claim 23, wherein said rule-based recurrent neural means multiplies selected ones of said plurality of fuzzy signals.

25. A recurrent artificial neural network as recited in claim 23, wherein said plurality of fuzzy signals corresponds to a plurality of fuzzy logic membership functions.

26. A recurrent artificial neural network as recited in claim 23, wherein said output weights means corresponds to a plurality of fuzzy logic rules.

27. A recurrent artificial neural network as recited in claim 23, further comprising fuzzifier neural means coupled to said rule-based recurrent neural means for receiving and fuzzifying a plurality of data signals to provide said plurality of fuzzy signals.

28. A recurrent artificial neural network for defuzzifying a plurality of fuzzy data generated in accordance with a plurality of fuzzy logic rules and membership functions, comprising:

a plurality of recurrent artificial neurons which receive and recurrently process a plurality of fuzzy signals representing fuzzified data which has been fuzzified in accordance with a plurality of fuzzy logic membership functions to provide in accordance therewith a plurality of recurrently processed fuzzy signals;

a plurality of interneuron weights, coupled to said plurality of recurrent artificial neurons, which receive and weight said plurality of recurrently processed fuzzy signals; and a single artificial neuron, coupled to said plurality of interneuron weights, which receives and sums said plurality of weighted, recurrently processed fuzzy signals to provide an output signal representing defuzzified data.

29. A recurrent artificial neural network as recited in claim 28, wherein said plurality of recurrent artificial neurons multiply selected ones of said plurality of fuzzy signals.

30. A recurrent artificial neural network as recited in claim 28, wherein said plurality of fuzzy signals corresponds to a plurality of fuzzy logic membership functions.

31. A recurrent artificial neural network as recited in claim 28, wherein said plurality of interneuron weights corresponds to a plurality of fuzzy logic rules.

32. A recurrent artificial neural network as recited in claim 28, further comprising a plurality of fuzzifier artificial neurons, coupled to said plurality of recurrent artificial neurons, which receive and fuzzify a plurality of data signals to provide said plurality of fuzzy signals.

33. A computer-implemented method for defuzzifying a plurality of fuzzy data generated recurrently in accordance with a plurality of fuzzy logic rules and membership functions, comprising the computer-implemented steps of:

receiving a plurality of fuzzy signals representing fuzzified data which has been fuzzified in accordance with a plurality of fuzzy logic membership functions;

recurrently processing said plurality of fuzzy signals to provide a plurality of recurrently processed fuzzy signals;

weighting said plurality of recurrently processed fuzzy signals; and summing said plurality of weighted, recurrently processed fuzzy signals, in accordance with a single summing function, to provide an output signal representing defuzzified data.

34. A method as recited in claim 33, wherein said step of processing said plurality of fuzzy signals to provide a plurality of processed fuzzy signals comprises multiplying selected ones of said plurality of fuzzy signals.

35. A method as recited in claim 33, wherein said plurality of fuzzy signals corresponds to a plurality of fuzzy logic membership functions.

36. A method as recited in claim 33, wherein said step of weighting said plurality of recurrently processed fuzzy signals comprises processing said plurality of recurrently processed fuzzy signals in accordance with a plurality of fuzzy logic rules.

37. A method as recited in claim 33, further comprising the step of receiving and fuzzifying a plurality of data signals to provide said plurality of fuzzy signals.

38. A recurrent artificial neural network for processing a plurality of input signals as a plurality of fuzzy logic rule antecedents, comprising:

input neural means for receiving and fuzzifying a plurality of input data signals to provide a plurality of fuzzified data signals corresponding to a plurality of fuzzy logic rule antecedents; and recurrent output neural means coupled to said input neural means for receiving and recurrently multiplying together selected ones of said plurality of fuzzified data signals to provide a plurality of recurrent product signals corresponding to a plurality of fuzzy logic rule consequents.

39. A recurrent artificial neural network as recited in claim 38, further comprising output weights means coupled to said recurrent output neural means for receiving and weighting said plurality of recurrent product signals to provide a plurality of weighted recurrent product signals.

40. A recurrent artificial neural network as recited in claim 39, wherein said output weights means corresponds to a plurality of fuzzy logic rules.

41. A recurrent artificial neural network as recited in claim 39, further comprising neural summing means coupled to said output weights means for receiving and summing said plurality of weighted recurrent product signals.

42. A recurrent artificial neural network for processing a plurality of input signals as a plurality of fuzzy logic rule antecedents, comprising:

a first plurality of artificial neurons which receive and fuzzify a plurality of input data signals to provide a plurality of fuzzified data signals corresponding to a plurality of fuzzy logic rule antecedents; and a second plurality of artificial neurons, including output-to-input feedback for each one thereof and coupled to said first plurality of artificial neurons, which receive and recurrently multiply together selected ones of said plurality of fuzzified data signals to provide a plurality of recurrent product signals corresponding to a plurality of fuzzy logic rule consequents.

43. A recurrent artificial neural network as recited in claim 42, further comprising a plurality of interneuron weights, coupled to said second plurality of artificial neurons, which receive and weight said plurality of recurrent product signals to provide a plurality of weighted recurrent product signals.

44. A recurrent artificial neural network as recited in claim 43, wherein said plurality of interneuron weights corresponds to a plurality of fuzzy logic rules.

45. A recurrent artificial neural network as recited in claim 43, further comprising an artificial neuron, coupled to said plurality of interneuron weights, which receives and sums said plurality of weighted recurrent product signals.

46. A computer-implemented method for recurrently processing a plurality of input signals as a plurality of fuzzy logic rule antecedents, comprising the computer-implemented steps of:

receiving a plurality of input data signals;

fuzzifying said plurality of input data signals to provide a plurality of fuzzified data signals corresponding to a plurality of fuzzy logic rule antecedents; and recurrently multiplying together selected ones of said plurality of fuzzified data signals and a plurality of local feedback signals to provide a plurality of recurrent product signals corresponding to a plurality of fuzzy logic rule consequents.

47. A method as recited in claim 46, further comprising the step of receiving and weighting said plurality of recurrent product signals to provide a plurality of weighted recurrent product signals.

48. A method as recited in claim 47, wherein said step of receiving and weighting said plurality of recurrent product signals to provide a plurality of weighted recurrent product signals comprises receiving and weighting said plurality of recurrent product signals in accordance with a plurality of fuzzy logic rules.

49. A method as recited in claim 47, further comprising the step of summing said plurality of weighted recurrent product signals.

50. A recurrent artificial neural network for processing a plurality of input data in accordance with fuzzy logic, comprising:

input neural means for receiving and fuzzifying a plurality of input signals representing numerical data to provide a plurality of fuzzy signals representing fuzzified data; and recurrent output neural means coupled to said input neural means for receiving and recurrently processing said plurality of fuzzy signals in accordance with a plurality of numerical fuzzy logic rule consequents in the form of singletons corresponding to unit-dimensional data to provide a plurality of numerical signals.

51. A recurrent artificial neural network as recited in claim 50, wherein said plurality of numerical fuzzy logic rule consequents comprise a plurality of neural weights associated with said recurrent output neural means.

52. A recurrent artificial neural network as recited in claim 50, further comprising neural summing means coupled to said recurrent output neural means for receiving and summing said plurality of numerical signals.

53. A recurrent artificial neural network for processing a plurality of input data in accordance with fuzzy logic, comprising:

a first plurality of artificial neurons which receive and fuzzify a plurality of input signals representing numerical data to provide a plurality of fuzzy signals representing fuzzified data; and a second plurality of artificial neurons, including output-to-input feedback for each one thereof and coupled to said first plurality of artificial neurons, which receive and recurrently process said plurality of fuzzy signals in accordance with a plurality of numerical fuzzy logic rule consequents in the form of singletons corresponding to unit-dimensional data to provide a plurality of numerical signals.

54. A recurrent artificial neural network as recited in claim 53, wherein said plurality of numerical fuzzy logic rule consequents comprise a plurality of neural weights associated with said second plurality of artificial neurons.

55. A recurrent artificial neural network as recited in claim 53, further comprising an artificial neuron, coupled to said second plurality of artificial neurons, which receives and sums said plurality of numerical signals.

56. A computer-implemented method for recurrently processing a plurality of input data in accordance with fuzzy logic, comprising the computer-implemented steps of:

receiving a plurality of input signals representing numerical data;

fuzzifying said plurality of input signals to provide a plurality of fuzzy signals representing fuzzified data; and recurrently processing said plurality of fuzzy signals and a plurality of local feedback signals in accordance with a plurality of numerical fuzzy logic rule consequents in the form of singletons corresponding to unit-dimensional data to provide a plurality of numerical signals.

57. A method as recited in claim 56, further comprising the step of summing said plurality of numerical signals.

* * * * *

UNITED STATES PATENT AND TRADEMARK OFFICE
CERTIFICATE OF CORRECTION

PATENT NO. : 5,606,646
DATED : February 25, 1997
INVENTOR(S) : EMDADUR RAHMAN KHAN and FATIH A. UNAL It is certified that error appears in the above-indentified patent and that said Letters Patent is hereby corrected as shown below:

On the cover page, section [75] Inventors: delete "Faith A. Unal" and replace with --Fatih A. Unal--.

In Col. 20, line 32, delete "7" and replace with --1--.

In Col. 20, line 35, after "network-based" insert --,--.

Signed and Sealed this

Thirteenth Day of May, 1997

*Attest:*

BRUCE LEHMAN

*Attesting Officer*  *Commissioner of Patents and Trademarks*